US009482520B2

United States Patent
Isei et al.

(10) Patent No.: US 9,482,520 B2
(45) Date of Patent: Nov. 1, 2016

(54) METHOD FOR MEASURING FLATNESS OF SHEET, DEVICE FOR MEASURING FLATNESS OF SHEET, AND PRODUCTION METHOD FOR STEEL SHEET

(71) Applicant: NIPPON STEEL & SUMITOMO METAL CORPORATION, Tokyo (JP)

(72) Inventors: Yoshito Isei, Tokyo (JP); Tomoya Kato, Tokyo (JP); Yasuhiro Aihara, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/890,684

(22) PCT Filed: May 14, 2014

(86) PCT No.: PCT/JP2014/062895
§ 371 (c)(1),
(2) Date: Nov. 12, 2015

(87) PCT Pub. No.: WO2014/185478
PCT Pub. Date: Nov. 20, 2014

(65) Prior Publication Data
US 2016/0102971 A1    Apr. 14, 2016

(30) Foreign Application Priority Data

May 14, 2013   (JP) ................................ 2013-101935

(51) Int. Cl.
| | |
|---|---|
| *G01B 11/25* | (2006.01) |
| *B21C 51/00* | (2006.01) |
| *G01B 11/30* | (2006.01) |
| B21B 38/00 | (2006.01) |

(52) U.S. Cl.
CPC .............. *G01B 11/25* (2013.01); *B21C 51/00* (2013.01); *G01B 11/2522* (2013.01); *G01B 11/306* (2013.01); *B21B 38/00* (2013.01)

(58) Field of Classification Search
CPC ......... B21B 38/00; B21B 38/02; B21B 1/22; B21C 51/00; G01B 11/30; G01B 11/25; G01B 11/306; G01B 11/2513
USPC ................................................ 356/600–623
See application file for complete search history.

(56) References Cited

U.S. PATENT DOCUMENTS

| | | | | |
|---|---|---|---|---|
| 2,867,149 A | * | 1/1959 | Goddard .............. | G01B 11/306 356/605 |
| 8,459,073 B2 | * | 6/2013 | Isei ........................ | B21O 51/00 72/11.2 |
| 9,138,790 B2 | * | 9/2015 | Isei ........................ | B21O 51/00 |
| 2013/0098127 A1 | * | 4/2013 | Isei ........................ | B21O 51/00 72/17.3 |

FOREIGN PATENT DOCUMENTS

| | | |
|---|---|---|
| JP | 63-134903 | 6/1988 |
| JP | 05-157537 | 6/1993 |
| JP | 11-104721 | 4/1999 |
| JP | 2008-058036 | 3/2008 |
| JP | 4666272 | 4/2011 |
| JP | 4666273 | 4/2011 |
| JP | 4797887 | 10/2011 |

OTHER PUBLICATIONS

International Search Report dated Jul. 1, 2014 issued in corresponding International Application No. PCT/JP2014/062895.

* cited by examiner

*Primary Examiner* — Hoa Pham
(74) *Attorney, Agent, or Firm* — Birch, Stewart, Kolasch & Birch, LLP

(57) ABSTRACT

A method for measuring flatness of a sheet includes acquiring a pattern image by projecting a light and dark pattern composed of light portions and dark portions onto a surface of the sheet, which is traveling between adjacent rolling stands, from a projection unit situated between the rolling stands, and capturing an image of the light and dark pattern with an image capture unit situated between the rolling stands, and measuring the flatness by analyzing the acquired pattern image. Arrangement parameters $L_0$, $\alpha$, $\beta$, hc and hp satisfy the following mathematical expression (1).

$$0.75 L_0 \leq \frac{\tan\alpha + \tan\beta}{1/h_C - 1/h_P} \leq 1.5 L_0 \quad (1)$$

6 Claims, 16 Drawing Sheets

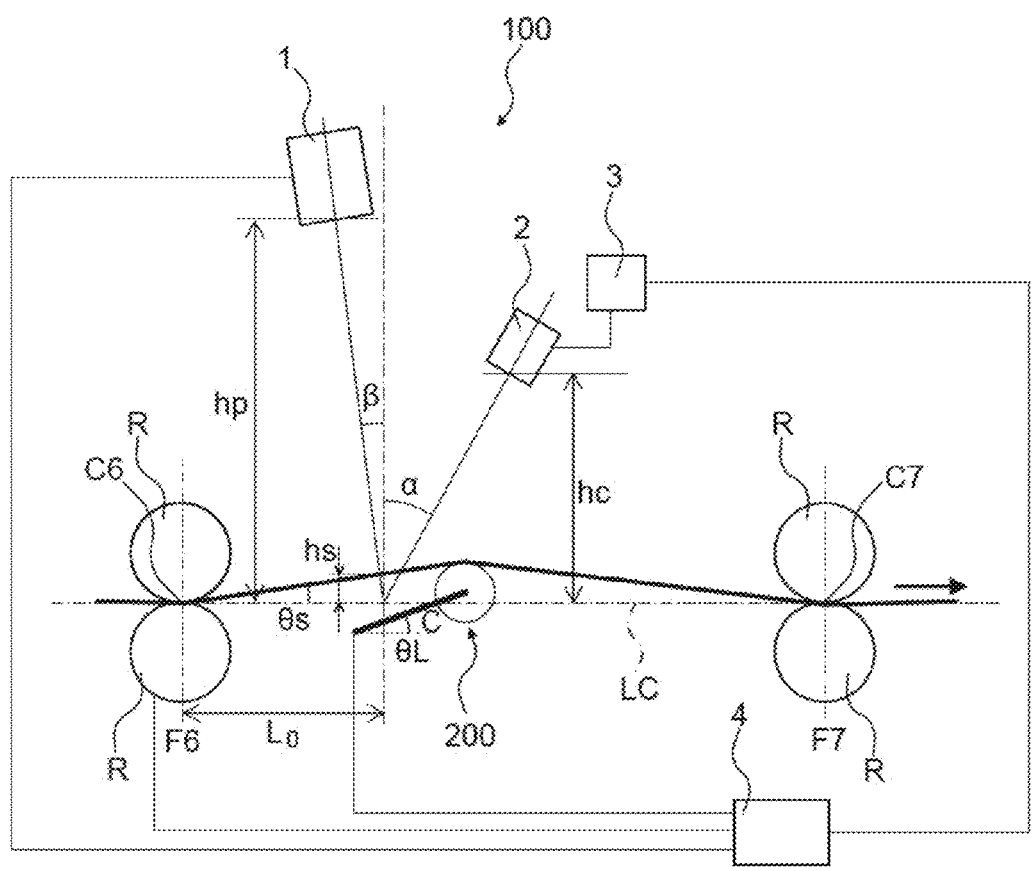

| | θL(deg) | θs(deg) |
|---|---|---|
| EXAMPLES | 0 | 0.48 |
| | 10 | 2.54 |
| | 15 | 3.14 |
| | 20 | 3.82 |
| | 25 | 4.72 |
| COMPARATIVE EXAMPLE | 0 | −2.57 |

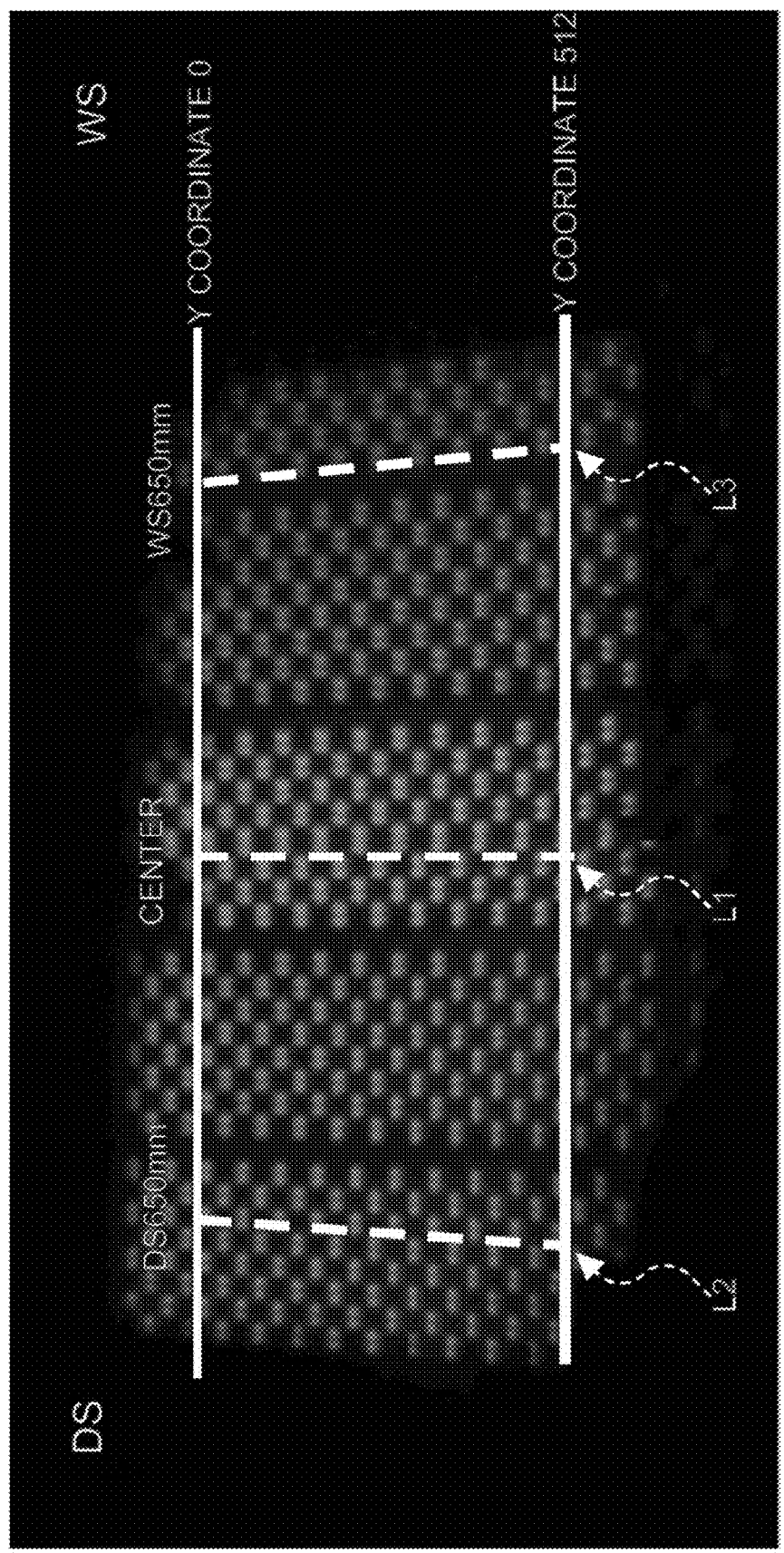

METHOD FOR MEASURING FLATNESS OF SHEET, DEVICE FOR MEASURING FLATNESS OF SHEET, AND PRODUCTION METHOD FOR STEEL SHEET

CROSS-REFERENCE TO RELATED APPLICATIONS

This application is a national stage application of International Application No. PCT/JP2014/062895, filed May 14, 2014, which is incorporated herein by reference in its entirety, and which claims priority to Japanese Patent Application No. 2013-101935, filed on May 14, 2013.

TECHNICAL FIELD

The present invention relates to a method for measuring flatness of a sheet, a device for measuring the flatness of a sheet, and a production method for a steel sheet. In particular, the present invention relates to a method and device that may accurately measure the flatness of a sheet traveling between rolling stands, between which a looper is equipped, irrespective of a looper angle, and to a production method for steel sheet using the same.

BACKGROUND ART

For both assuring product quality of a sheet and producing the sheet stably, excellent flatness is required. Accordingly, properly managing flatness in a sheet production process has been a matter of interest since heretofore.

Values referred to as "differential elongation rate" and "steepness" are commonly used as indexes representing flatness.

The differential elongation rate $\Delta\epsilon$ is the difference over a certain range in a length direction of a sheet (i.e., the traveling direction in a production line) between an elongation rate $\epsilon_{CENT}$ of a central portion in a width direction of the sheet and an elongation rate $\epsilon_{EDGE}$ elsewhere than the sheet width direction central portion (generally, a vicinity of an edge). The differential elongation rate $\Delta\epsilon$ is represented by the following mathematical expression (2).

$$\Delta\epsilon = \epsilon_{CENT} - \epsilon_{EDGE} \quad (2)$$

The steepness $\lambda$ is defined, using a sheet wave height $\delta$ and a pitch P, as $\lambda = \delta/P$. Because the shapes of sheet waves are close to sine waves, the differential elongation rate $\Delta\epsilon$ and the steepness $\lambda$ (%) have a well-known relationship represented by the following mathematical expression (3).

$$\lambda = \begin{cases} +\dfrac{2}{\pi}|\Delta\varepsilon|^{1/2} \times 100 \text{ (if } \Delta\varepsilon \geq 0) \\ -\dfrac{2}{\pi}|\Delta\varepsilon|^{1/2} \times 100 \text{ (if } \Delta\varepsilon < 0) \end{cases} \quad (3)$$

A production line for hot-rolled steel sheet, which is an example of a sheet, commonly consists of, for example, a heating furnace, a roughing mill, a finishing mill, a cooling zone, and a coil winder. A steel slab heated in the heating furnace is rolled by the roughing mill and formed a steel slab (a rough bar) of 30 to 60 mm thick. Then, the steel slab is rolled by the finishing mill, which is equipped with six or seven rolling stands, and formed into hot-rolled steel sheet with a thickness aimed by a customer. The hot-rolled steel sheet is cooled in the cooling zone and wound by the coil winder.

Producing hot-rolled steel sheet with excellent flatness is important for both assuring product quality and maintaining high productivity, in stably feeding the sheet to the finishing mill, winding the sheet at the coil winder and so forth. Flatness failures of hot-rolled steel sheets that arise subsequent to the finishing mill are caused by elongation rate that is uneven in the sheet width direction occurring in the finishing mill and the cooling zone. Accordingly, methods have been proposed for producing hot-rolled steel sheet with excellent flatness, including: a method of installing a flatness gauge, a sheet thickness profiler or the like between the rolling stands that constitute the finishing mill or at the exit side of the finishing mill and performing feedback control of work roll benders of the rolling stands in response to measured values; and a method of learning control of setup conditions such as work roll shift positions, load distribution in the finishing mill and the like. The above-mentioned control methods are described in, for example, Japanese Patent Application Laid-Open (JP-A) No. H11-104721. A further method has been proposed, of situating a flatness meter at the exit side of the cooling zone and performing feedback control of cooling water quantities from cooling nozzles of the cooling zone in response to measured values. To realize the control methods mentioned above, methods and devices for measuring the flatness of hot-rolled steel sheet traveling at high speed, between the rolling stands, at the exit side of the finishing mill, or at the exit side of the cooling zone, have been proposed and employed in practice.

A method for measuring the flatness of hot-rolled steel sheet that is conventionally known is a method of projecting a linear pattern composed of a plurality of light lines that extend in the sheet width direction onto the surface of hot-rolled steel sheet that is being hot-rolled and traveling, capturing an image of the linear pattern with a two-dimensional camera from a direction that is different to the direction of projection of the linear pattern and, on the basis of distortions of the linear pattern in the captured image, measuring the surface shape of the hot-rolled steel sheet and hence the flatness. For example, JP-A No. 2008-58036 recites a method of using a slide on which a high-density linear pattern is drawn, projecting the high-density linear pattern composed of a plurality of light lines extending in the sheet width direction onto a sheet surface, capturing an image of the same with a camera and, on the basis of distortions of the linear pattern in the captured image, measuring the surface shape of the sheet and hence the flatness. With this method, because a high-density linear pattern is projected, a measurement resolution (spatial resolution) of the surface shape is high and accurate measurement of the surface shape of the sheet may be expected.

The shape measurement method as described in JP-A No. 2008-58036 is commonly referred to as the grating pattern projection method. It is not limited to measuring surface shapes of steel sheet but is used for a variety of applications.

FIG. 1 is a diagram schematically illustrating an equipment structure example for implementing the grating pattern projection method. As illustrated in FIG. 1, in the grating pattern projection method, a grating pattern (a light and dark pattern) PT' is projected onto a sheet surface from diagonally above the sheet surface, using a projector PR equipped with a light source LT, a slide SL on which the grating pattern (generally a linear pattern) PT is drawn, and a focusing lens LN. An image of the grating pattern PT' projected onto the surface of the sheet PL is captured using a two-dimensional camera CA, in a direction that is different from the projection direction of the grating pattern PT. In this process, if the surface shape of the sheet varies, inclination angles of the surface of the sheet PL vary, and a pitch PC (generally, the spacing of light lines composing the linear pattern) of the grating pattern PT' in the image captured by the camera varies in accordance with the inclination angles of the surface of the sheet PL. A relationship between inclination angles of the sheet surface and the pitch PC of light portions of the grating pattern PT' in the captured image can be geometrically calculated. Therefore, if the pitch PC of light portions of the grating pattern PT' in the captured image is measured, the inclination angles of the sheet surface can be calculated on the basis of the aforementioned relationship with these measurement results (i.e., the relationship between the inclination angles of the sheet surface and the pitch PC of the light portions of the grating pattern PT' in the captured image). The surface shape of the sheet PL may be calculated by integrating the calculated inclination angles. The relationship between the inclination angles of the surface of the sheet PL and the pitch PC of the light portions of the grating pattern PT' in the captured image includes, as a parameter, a pitch PC of the light portions of the grating pattern PT' in a captured image of the grating pattern PT' that is acquired from a standard sheet (a calibration sheet) that has a flat surface shape.

As methods that employ the above-described grating pattern projection method to measure the flatness of sheets, the present inventors have proposed the methods described in Japanese Patent Nos. 4,666,272 and 4,666,273. According to these methods, if an image capturing means is equipped at a location at which regular reflection light from a light and dark pattern projected onto the surface of a sheet with strong regular reflectivity can be detected, in order to reduce the space required for arrangement of a measuring device, the flatness of the sheet may be accurately measured. However, these methods presume that the flatness is measured mainly at the exit side of a finishing mill.

Ordinarily, a looper for controlling tension in a steel sheet is equipped between rolling stands structuring a finishing mill. The tension in the steel sheet is controlled by altering a looper angle. When the looper angle is changed, a sheet passage route of the steel sheet traveling between the rolling stands changes. Thus, when the looper angle is changed, an inclination angle and height (vertical direction position) of the steel sheet surface change.

Therefore, when the flatness of the steel sheet between the rolling stands is being measured, even if the steel sheet has, for example, a flat surface shape, the pitch of the light portions of a light and dark pattern in a captured image changes in accordance with alterations of the looper angle, causing measurement errors.

It has been proposed, for example, in Japanese Patent No. 4,797,887, to prepare a plurality of pitches (calibration values) of the light portions in a light and dark pattern from a plurality of standard sheets (calibration sheets) associated with different heights of a steel sheet surface in advance, to measure the height of a steel sheet, and to use the calibration value corresponding to the measured height.

However, even if the method described in Japanese Patent No. 4,797,887 is employed when measuring the flatness of a steel sheet between rolling stands, this method only takes account of the height of the steel sheet surface. Situations in which both the height of a steel sheet surface and an inclination angle of the steel sheet surface are changed when the looper angle is changed are not considered. Moreover, the necessary preparation of a plurality of calibration values takes time.

SUMMARY OF INVENTION

Technical Problem

An object of the present invention is to provide a method and device that may accurately measure the flatness of a sheet such as steel sheet or the like traveling between rolling stands, between which a looper is equipped, irrespective of the looper angle, and a production method for steel sheet that utilizes the same.

Solution to Problem

As a result of diligent investigations to achieve the object described above, the present inventors have discovered that, when vertical upward height positions of a projection unit and an image capture unit that are situated between adjacent rolling stands are different, the pitch of light portions of a light and dark pattern changes in accordance with up and down movement of a sheet surface by a looper, in addition to which the pitch of the light portions also changes in accordance with alterations of a tilt of the sheet surface by the looper. Hence, the inventors have discovered a relationship in which these two changes counteract one another if respective height positions and angles of the projection unit and the image capture unit are suitably selected. Consequently, the inventors have determined that the effects of a looper angle may be moderated if arrangement positions and arrangement angles of the projection unit that projects the light and dark pattern and the image capture unit that captures the light and dark pattern projected onto the surface of the sheet are suitably selected; thus, the flatness of the sheet may be accurately measured without influence of the looper angle change.

The present inventors have achieved the present aspects in accordance with the findings described above. That is, in order to achieve the object described above, a first aspect provides a method for measuring flatness of a sheet that includes: a step of acquiring a pattern image by projecting a light and dark pattern composed of light portions and dark portions onto a surface of the sheet that is traveling between adjacent rolling stands from a projection unit situated between the rolling stands, and capturing an image of the light and dark pattern with an image capture unit situated between the rolling stands; and a step of measuring the flatness of the sheet by analyzing the acquired pattern image, wherein if $L_0$ represents a distance in a horizontal direction between an intersection of respective optical axes of the projection unit and the image capture unit and, of the adjacent rolling stands, the rolling stand that is equipped at the opposite side of the intersection with respect to a looper that controls tension of the sheet between the rolling stands, $\alpha$ represents an angle formed between a vertical direction and a straight line formed by projecting the optical axis of the image capture unit onto a plane that contains a direction parallel to a rolling direction and the vertical direction, a value of $\alpha$ being positive if the optical axis of the image capture unit is inclined from the vertical direction toward the looper side, $\beta$ represents an angle formed between the vertical direction and a straight line formed by projecting the optical axis of the projection unit onto the plane, a value of $\beta$ being positive if the optical axis of the projection unit is inclined from the vertical direction toward the rolling stand side, hc represents a distance in the vertical direction between a pass line, which is a straight line passing through crest points of respective lower side work rolls of pairs of upper and lower work rolls that are respectively equipped at the adjacent rolling stands, and an image principal point of a lens of the image capture unit, and hp represents a distance in the vertical direction between the pass line and an image principal point of a lens of the projection unit, then $L_0$, $\alpha$, $\beta$, hc and hp satisfy the following mathematical expression (1).

$$0.75L_0 \leq \frac{\tan\alpha + \tan\beta}{1/h_C - 1/h_P} \leq 1.5L_0 \quad (1)$$

For reference, an explanation of the parameters when measuring downstream of the looper is illustrated in FIG. 2B, and an explanation of the parameters when measuring upstream of the looper is illustrated in FIG. 2C.

Measurement accuracy may be assured and endurance between the finishing stands may be assured by adding the following conditions to mathematical expression (1).

If $20°\leq\alpha+\beta\leq90°$, then hp/hc≥1.133 and hc≥1000 mm
If $-90°\leq\alpha+\beta\leq-20°$, then hc/hp≥1.133 and hp≥1000 mm According to the first aspect, as described below, when the projection unit and the image capture unit are arranged so as to satisfy the above mathematical expression (1), even if the looper angle is changed, the pitch of the light portions of the light and dark pattern in the captured pattern image (the pitch in the traveling direction of the sheet) is resistant to change. Therefore, the flatness of a sheet such as steel sheet or the like traveling between rolling stands, between which a looper is equipped, may be accurately measured irrespective of the looper angle. A device for measuring flatness of the sheet may be provided under the same conditions.

A standard pitch may be measured in a state in which a calibration sheet is tilted by 2° relative to the pass line. In usual rolling, the looper angle varies from 0° to 25° and the sheet angle varies from approximately 0° to 4°. In order to minimize errors, if the standard pitch measurement is carried out as described above, a sheet angle variation width may be set to ±2° and the effects of alterations in the looper angle may be kept to not more than ±0.72°.

Further, in order to achieve the object described above, a second aspect provides a production method for steel sheet that includes: a step of rolling a steel slab, which has been rough rolled by a roughing mill, at rolling stands that constitute a finishing mill; and a step of cooling the rolled steel sheet at a cooling zone, wherein at least one of a rolling condition at the rolling stands and a cooling condition at the cooling zone is controlled on the basis of the steel sheet flatness measured by the above-mentioned method for measuring flatness.

Advantageous Effects of Invention

According to the present invention, the flatness of a sheet such as steel sheet or the like that is traveling between rolling stands, between which a looper is equipped, may be accurately measured irrespective of a looper angle; consequently, product quality of the steel sheet may be assured and the steel sheet may be consistently produced.

BRIEF DESCRIPTION OF DRAWINGS

FIG. 2C is a schematic diagram illustrating an equipment structure example of the flatness measurement device for implementing the flatness measurement method according to the present exemplary embodiment, and showing an explanation of the parameters when the measurement is performed upstream of the looper.

FIG. 15C is a graph illustrating an example of a captured pattern image and specified shape measurement lines.

DESCRIPTION OF EMBODIMENTS

Herebelow, a case in which the sheet is hot-rolled steel sheet and the flatness thereof is measured between rolling stands of a finishing mill of a hot-rolled steel sheet production line is given as an example for an exemplary embodiment of the present invention and is described with reference as appropriate to the attached drawings.

—1. Overall Structure of Flatness Measurement Device—

Figure 1:
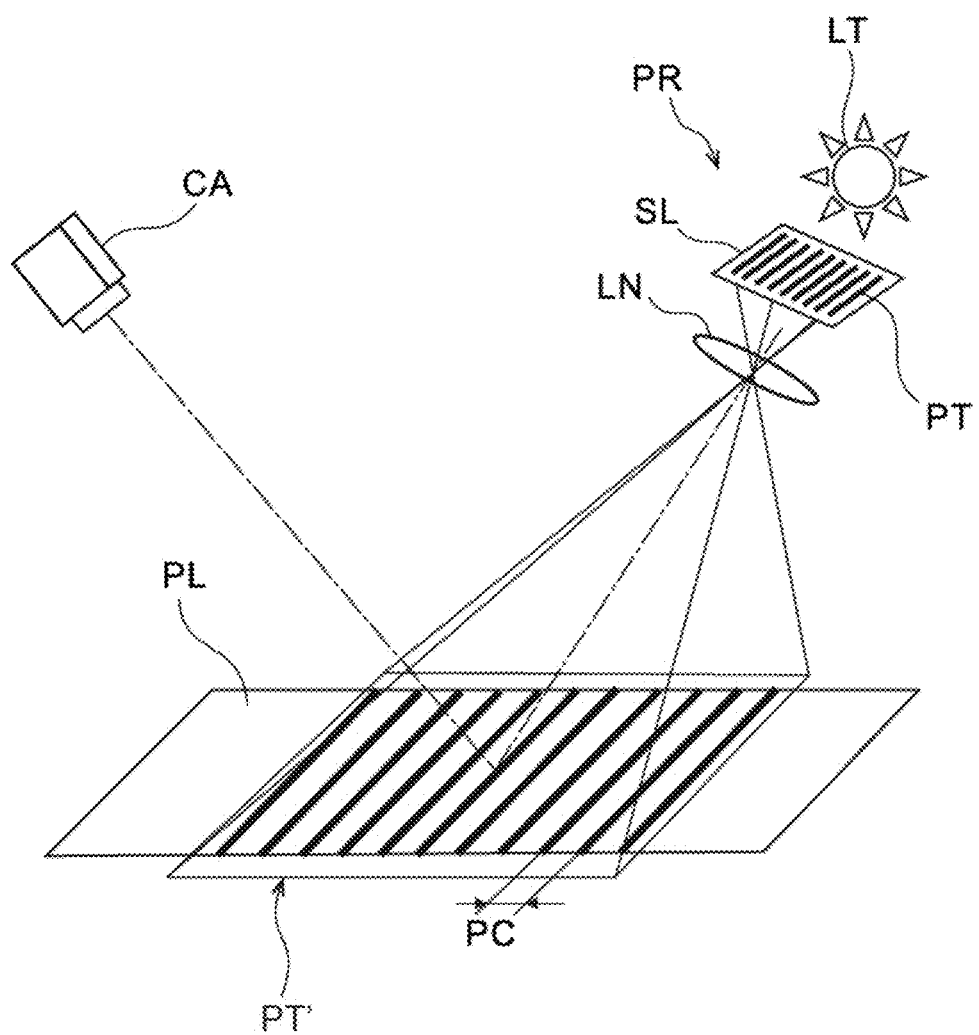
FIG. 1 is a diagram schematically illustrating an equipment structure example for implementing a grating pattern projection method.
Figure 2A:
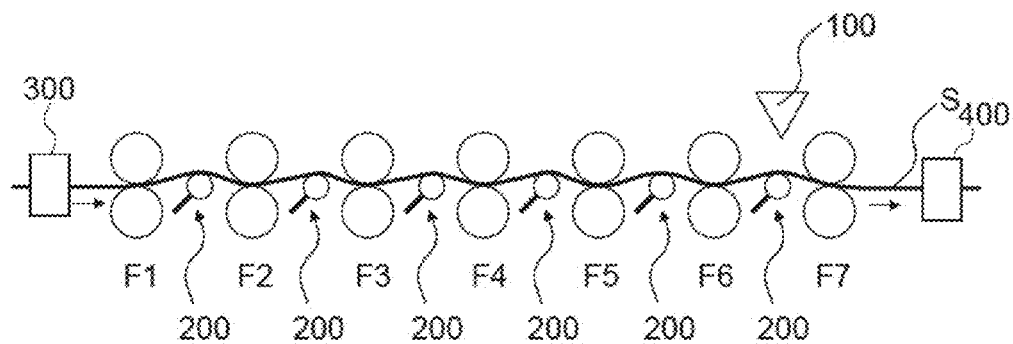
FIG. 2A is a schematic diagram illustrating a situation state of a flatness measurement device at a finishing mill.
Figure 2B:
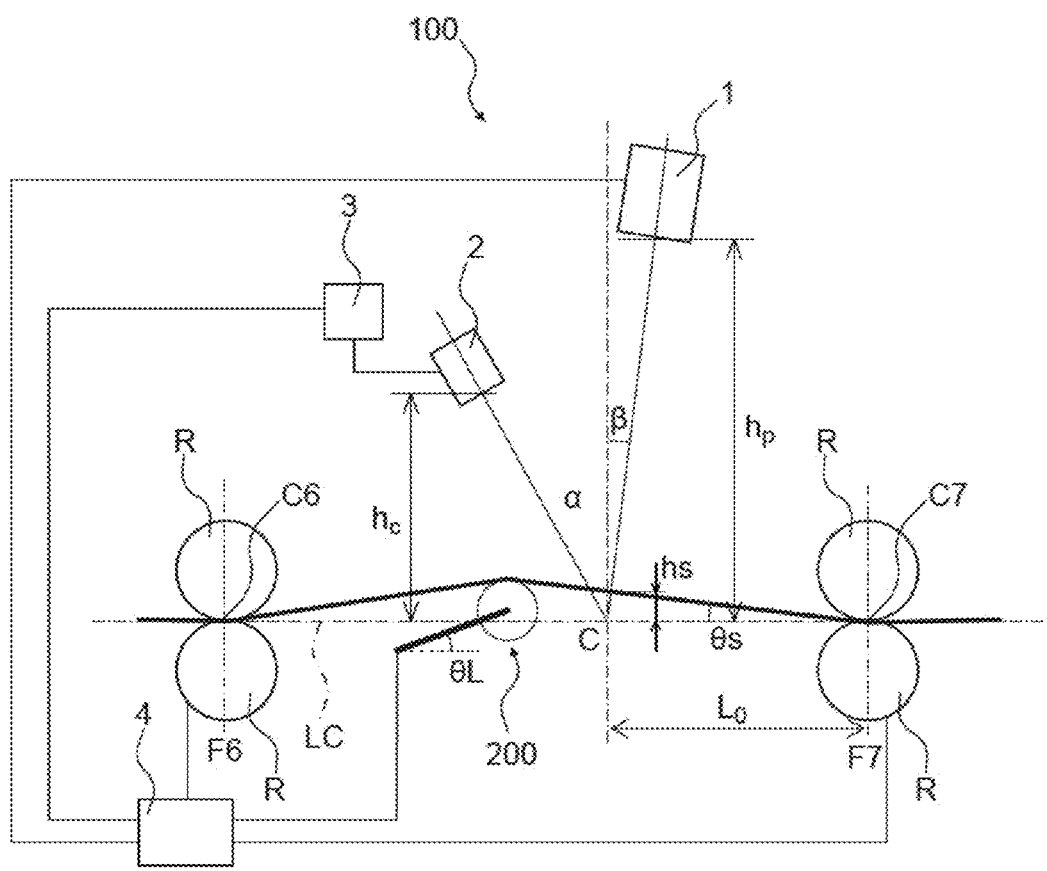
FIG. 2B is a schematic diagram illustrating an equipment structure example of the flatness measurement device for implementing a flatness measurement method according to a present exemplary embodiment, and showing an explanation of parameters when the measurement is performed downstream of a looper.

FIG. 2A to FIG. 2C are schematic diagrams illustrating a schematic structural example of a flatness measurement device for implementing a flatness measurement method according to the present exemplary embodiment. FIG. 2A illustrates a situation state of the flatness measurement device at a finishing mill, and FIG. 2B and FIG. 2C illustrate schematic structures of the flatness measurement device.

As illustrated in FIG. 2A, a flatness measurement device 100 according to the present exemplary embodiment is a device that measures flatness of a hot-rolled steel sheet S between a sixth rolling stand F6 and a seventh rolling stand F7 of a finishing mill of a hot-rolled steel sheet production line in which seven rolling stands F1 to F7 are arranged. A looper 200 that controls tension of the hot-rolled steel sheet S is equipped between the rolling stands, between the sixth rolling stand F6 and the seventh rolling stand F7. The flatness measurement device 100 is provided with a projection unit 1, an image capture unit 2 and an image analysis device 3. The projection unit 1 projects a light and dark pattern composed of light portions and dark portions onto a surface of the hot-rolled steel sheet S. The image capture unit 2 captures an image of the light and dark pattern projected onto the surface of the hot-rolled steel sheet S and acquires a pattern image. The image analysis device 3 analyzes the pattern image acquired by the image capture unit 2.

As shown in FIG. 2B and FIG. 2C, a measurement position may be either between the looper 200 according to the present exemplary embodiment and the upstream side rolling stand F6 or between the looper 200 and the downstream side rolling stand F7.

Figure 3A:
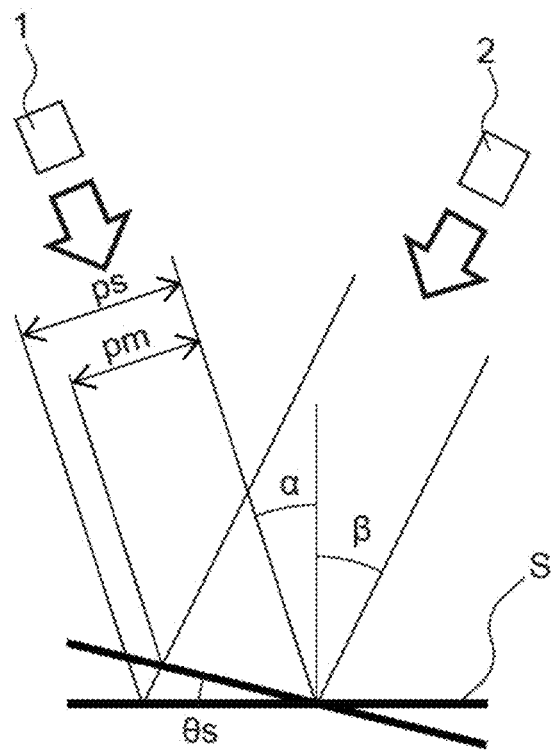
FIG. 3A is a descriptive diagram illustrating a relationship between inclination angles of a sheet surface and changes in the pitch of light portions of a light and dark pattern.

The symbol α represents an angle formed between a vertical direction and a straight line formed by projecting an optical axis of the image capture unit onto a plane that contains a direction parallel to a rolling direction and the vertical direction. The value of a is positive when the optical axis of the image capture unit 2 is inclined from the vertical direction toward the looper 200 side. In FIG. 3A, a represents the angle formed between the vertical direction and the optical axis of the image capture unit. The symbol β represents an angle formed between the vertical direction and a straight line formed by projecting an optical axis of the projection unit onto the plane that contains the direction parallel to the rolling direction and the vertical direction. The value of β is positive when the optical axis of the projection unit 1 is inclined from the vertical direction toward the side of a rolling stand (the side of the rolling stand F7 in FIG. 2B and the side of the rolling stand F6 in FIG. 2C), which is the opposite side from the looper 200 side. In FIG. 3A, β represents the angle formed between the vertical direction and the optical axis of the projection unit.

Figure 18:
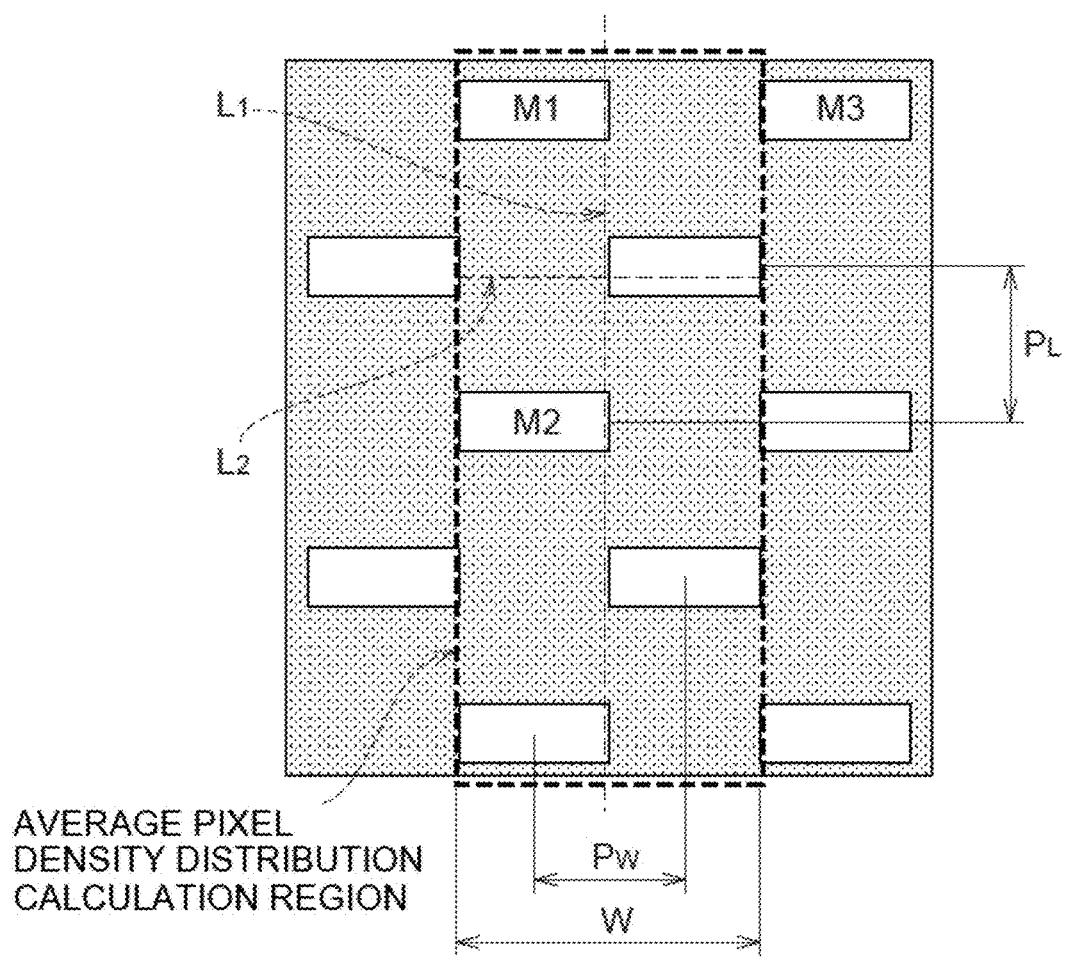
FIG. 18 is a descriptive diagram illustrating a staggered light and dark pattern.

The projection unit 1 that is employed may be, for example, a projector constituted with a lamp and a slide or the like as described in Japanese Patent No. 4,666,272, an LED light source equipped with a plurality of LEDs as described in Japanese Patent No. 4,666,273, or the like. A periodic light and dark pattern from the projection unit 1 that is used is, for example, a staggered pattern in which light portions M1, M2, M3 and so forth are arranged in a staggered pattern at respective predetermined specified pitches in a longitudinal direction and a lateral direction (FIG. 18). This staggered pattern is projected onto the surface of the sheet such that the longitudinal direction of the staggered pattern is along the length direction of the sheet and the lateral direction of the staggered pattern is along the width direction of the sheet. A pitch of the light portions in the length direction of the sheet is represented by $P_L$ and a pitch of the same in the width direction is represented by $P_W$. Various publicly known structures may be employed as the projection unit 1 provided the light and dark pattern can be projected. Therefore, detailed descriptions of the projection unit 1 are not given herein.

The image capture unit 2 that is employed may be, for example, a two-dimensional CCD camera with an electronic shutter that has light detection elements at SVGA resolution and outputs image signals by progressive scanning, as described in Japanese Patent Nos. 4,666,272 and 4,666,273. As is described in Japanese Patent Nos. 4,666,272 and 4,666,273, a CCD camera that captures images at low sensitivity and a CCD camera that captures images at high sensitivity may be provided to serve as the image capture unit 2 and the two imaging fields thereof arrayed so as to include a mutually overlapping portion. Thus, various publicly known structures may be employed as the image capture unit 2 provided images of the light and dark pattern can be captured. Therefore detailed descriptions of the image capture unit 2 are not given herein.

The image analysis device 3 is, for example, a structure in which a program that executes processing for calculating flatness (hereinafter referred to as "the flatness analysis program") is installed on a general purpose computer, as described in Japanese Patent Nos. 4,666,272 and 4,666,273. The image analysis device 3 is configured so as to save image signals with a predetermined gradation (for example, 256 gradation levels) that are outputted from the image capture unit 2 in memory. The image data saved in the memory of the image analysis device 3 (the pattern image) is analyzed by the flatness analysis program. Analysis results that are flatness measurement values are outputted to a monitor screen of the image analysis device 3 and to a higher level control device (a control device 4 that controls the finishing mill or the like).

—2. General Processing of the Flatness Analysis Program—

For example, as described in Japanese Patent Nos. 4,666,272 and 4,666,273, the above-mentioned flatness analysis program calculates the flatness by executing (1) shape measurement line specification processing, (2) average pixel density distribution calculation processing along the shape measurement lines, (3) hot-rolled steel sheet surface inclination angle distribution and surface shape calculation processing along the shape measurement lines, (4) flatness (steepness) computation processing, and so forth. Various publicly known configurations described in Japanese Patent Nos. 4,666,272 and 4,666,273 may be employed as the flatness analysis program. Therefore, the flatness analysis program is only described in outline herein; detailed descriptions thereof are not given.

(1) Shape Measurement Line Specification Processing

In the pattern image obtained by the image capture unit 2, the present processing specifies shape measurement lines that extend in the longitudinal direction of the pattern image (corresponding to the length direction of the sheet) with a predetermined pitch in the lateral direction of the pattern image (corresponding to the width direction of the sheet).

(2) Average Pixel Density Distribution Calculation Processing Along the Shape Measurement Lines The present processing calculates average pixel density distributions in the pattern image acquired by the image capture unit 2 by averaging pixel densities along each of lines L2 that, as illustrated in FIG. 18, extend in the lateral direction of the staggered pattern (the width direction of the sheet) with a length that is at least twice the specified lateral direction pitch of the light portions, passing through pixels on shape measurement lines L1 that extend along the longitudinal direction of the staggered pattern (the length direction of the sheet). The symbol W in FIG. 18 represents a width in the sheet width direction of an average pixel density distribution calculation region. Because of this processing, the light and dark pattern is clearly observed in a region in which regular reflected light is detected, and measurement accuracy is not adversely affected.

(3) Hot-Rolled Steel Sheet Surface Inclination Angle Distribution and Surface Shape Calculation Processing Along the Shape Measurement Lines This processing calculates longitudinal direction pitch distributions pm(x) of the light portions of the periodic light and dark pattern (the staggered pattern) along the shape measurement lines, on the basis of the average pixel density distributions along the shape measurement lines calculated as mentioned above for the hot-rolled steel sheet S that is the object of the measurement of flatness. The present processing also calculates, for a pattern image acquired from a standard sheet that has a flat surface shape on a sheet passage route of the hot-rolled steel sheet S, longitudinal direction pitch distributions ps(x) of the light portions of the periodic light and dark pattern (the staggered pattern) along the shape measurement lines, on the basis of average pixel density distributions along the shape measurement lines. As a method for calculating pm(x) and ps(x), a phase analysis technique as described in Japanese Patent Nos. 4,666,272 and 4,666,273 may be employed.

Then the present processing calculates inclination angle distributions θ(x) of the surface of the hot-rolled steel sheet S along the shape measurement lines on the basis of a ratio R(x)=pm(x)/ps(x) of the calculated longitudinal direction pitch distributions of the light portions of the light and dark pattern (the staggered pattern) and the following mathematical expression (4).

$$\theta_m(x) = \tan^{-1}\left(\frac{1 - R(x)}{\tan\alpha + R(x)\tan\beta}\right) \quad (4)$$

In the above mathematical expression (4), x represents positions in the longitudinal direction of the light and dark pattern (the staggered pattern) in the pattern image (i.e., positions along the length direction of the sheet). The symbol θm(x) represents a distribution of inclination angles between a horizontal direction and the surface of the sheet. The values of θm(x) are positive where the surface is inclined toward the side at which the rolling stand is equipped, which is the opposite side from the side at which the looper 200 is equipped, that is, where the surface slopes toward the side thereof at which the projection unit is equipped.

Finally, the present processing calculates the surface shape of the hot-rolled steel sheet S along the shape measurement lines by integrating, along each shape measurement line, the inclination angles of the surface of the hot-rolled steel sheet S along the shape measurement line calculated as described above.

(4) Flatness (Steepness) Computation Processing

The present processing computes a steepness on the basis of the surface shapes of the hot-rolled steel sheet S along the shape measurement lines that have been calculated as described above. During the calculation of the steepness, first, an elongation rate for each shape management line is calculated on the basis of a surface length in section of interest of the surface along each shape measurement line and a straight-line distance through that range. A differential elongation rate Δε which is the difference between an elongation rate ε$_{CENT}$ of a shape measurement line at a width direction central portion of the hot-rolled steel sheet S and an elongation rate ε$_{EDGE}$ of another shape measurement line, is computed (see the aforementioned mathematical expression (2)). Then the steepness λ is computed on the basis of the differential elongation rate Δε and the aforementioned mathematical expression (3).

—3. Description of Effects of Arrangement Examples of the Flatness Measurement Device—

The flatness measurement device 100 according to the present exemplary embodiment is characterized by the projection unit 1 and the image capture unit 2 being arranged with a particular relationship. This is described below, including a process by which the particular relationship is derived. Firstly, as illustrated in FIG. 2B, a case in which the measurement position is between the looper 200 and the downstream side rolling stand F7 is illustrated as an example and effects thereof are described.

Figure 3B:
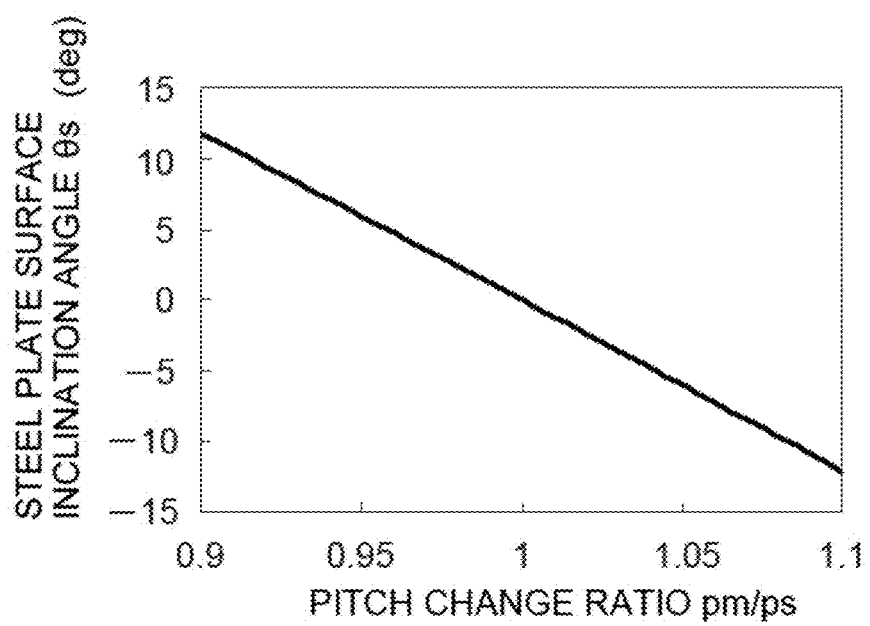
FIG. 3B is a graph illustrating the relationship between inclination angles of the sheet surface and changes in the pitch of the light portions of the light and dark pattern.

FIG. 3A is a descriptive diagram illustrating a relationship between inclination angles of the sheet surface and changes in the pitch of the light portions of the light and dark pattern. FIG. 3B is a graph illustrating the relationship between inclination angles and changes in pitch.

In FIG. 3A, the symbol θs represents the inclination angle formed between the horizontal direction and the surface of the sheet S. The value of θs is positive when the surface is inclined toward the side at which the rolling stand is equipped, that is, inclined toward the side thereof at which the projection unit 1 is equipped.

The symbol ps represents the longitudinal direction pitch (corresponding to the length direction of the hot-rolled steel sheet S) of the light portions of the light and dark pattern when the hot-rolled steel sheet S is equipped horizontally at a standard vertical direction position. The symbol pm represents the longitudinal direction pitch of the light portions of the light and dark pattern when the hot-rolled steel sheet S is tilted by the inclination angle θs from the horizontal direction.

Incidentally, the graph illustrated in FIG. 3B is a graph for a case in which α=28° and β+−3°.

As shown in FIG. 3B, the inclination angle θs of the surface of the hot-rolled steel sheet S and the longitudinal direction pitch pm of the light portions of the light and dark pattern have a monotonically decreasing relationship in which the pitch pm decreases as the inclination angle θs increases. It can also be seen that the relationship between the two is dependent on an arrangement angle α of the image capture unit 2 and an arrangement angle β of the projection unit 1.

Figure 4A:
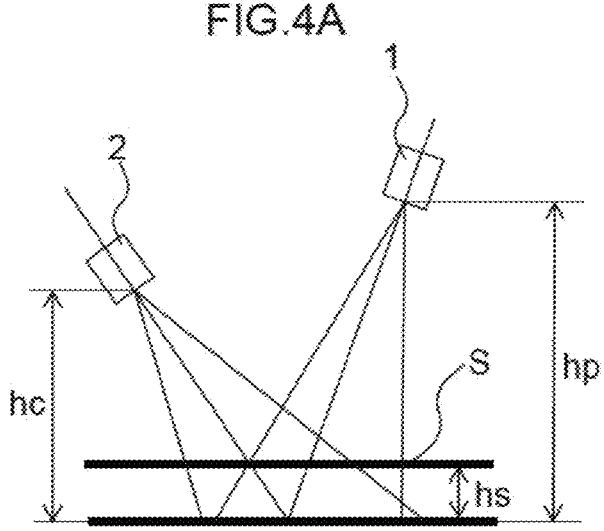
FIG. 4A is a diagram illustrating a relationship between heights of the sheet surface and changes in the pitch of the light portions of the light and dark pattern.
Figure 4B:
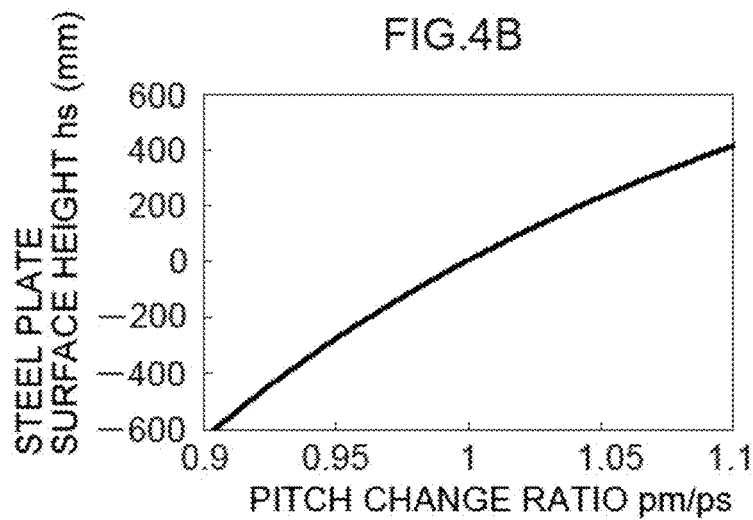
FIG. 4B is a graph illustrating the relationship between heights of the sheet surface and changes in the pitch of the light portions of the light and dark pattern.

FIG. 4A is a diagram illustrating a relationship between heights of the sheet surface (a vertical direction position) and changes in the pitch of the light portions of the light and dark pattern. FIG. 4A is a descriptive diagram. FIG. 4B is a graph illustrating the relationship between heights and changes in pitch.

In FIG. 4A, the symbol hc represents a vertical direction distance between the pass line and an image principal point of a lens of the image capture unit 2. The symbol hp represents a vertical direction distance between the pass line and an image principal point of a lens of the projection unit 1. As illustrated in FIG. 2B and FIG. 2C, the term "pass line" means a straight line LC through crest points C6 and C7 of respective lower side work rolls R of pairs of upper and lower work rolls R that are respectively provided at the adjacent rolling stands F6 and F7.

The symbol ps represents the longitudinal direction (corresponding to the length direction of the hot-rolled steel sheet S) pitch of the light portions of the light and dark pattern when the hot-rolled steel sheet S is equipped at the pass line position. The symbol pm represents the longitudinal direction pitch of the light portions of the light and dark pattern when the hot-rolled steel sheet S is equipped horizontally at a position vertically upward from the pass line position by a height hs.

The graph illustrated in FIG. 4B is a graph for a case in which hp=4300 mm and hc=2300.

As shown in FIG. 4B, in a case in which the height hp of the projection unit 1 is different from the height hc of the image capture unit 2 and the relationship hp>hc applies, the height hs of the surface of the hot-rolled steel sheet S and the longitudinal direction pitch pm of the light portions of the light and dark pattern have a monotonically increasing relationship in which the pitch pm increases as the height hs increases. It can also be seen that the relationship between the two is dependent on the arrangement height hp of the projection unit 1 and the arrangement height hc of the image capture unit 2.

As described above, it is shown that when a relationship in which the projection unit 1 is equipped vertically further upward than the image capture unit 2 applies (hp>hc), the pitch of the light portions of the light and dark pattern increases as the surface of the hot-rolled steel sheet S is moved upward by the looper 200 but the pitch of the light portions of the light and dark pattern decreases as the surface of the hot-rolled steel sheet is tilted toward the projection unit 1 by the looper 200. In other words, these two conditions have a mutually counteracting relationship. Therefore, it is apparent that if the arrangement positions hp and hc and the arrangement angles α and β of the projection unit 1 and the image capture unit 2 are suitably specified, effects of the looper angle 200 may be moderated and the flatness of the hot-rolled steel sheet S may be accurately measured irrespective of the looper angle.

—4. Derivation of a General Mathematical Expression of the Particular Arrangement Relationship—

As illustrated in the above-described FIG. 2B and FIG. 2C, when the height hs of the surface of the hot-rolled steel sheet S and the inclination angle θs of the surface of the hot-rolled steel sheet S change in accordance with the angle θL of the looper 200, the relationship between the height hs and the inclination angle θs can be expressed geometrically by the following mathematical expression (5). The meaning of "the height hs" of the surface of the hot-rolled steel sheet S is a vertical direction distance between the pass line (the line LC) and the surface of the hot-rolled steel sheet S (a distance from the pass line of the surface of the hot-rolled steel sheet S positioned on a straight line extending in the vertical direction from an intersection C of the optical axes of the projection unit 1 and the image capture unit 2).

$$h_S = L_0 \tan \theta_S \quad (5)$$

In mathematical expression (5), $L_0$ represents a horizontal direction distance between the intersection of the optical axes of the projection unit 1 and the image capture unit 2 and the rolling stand, of the adjacent rolling stands, that is equipped at the opposite side of the intersection with respect to the looper 200.

If a rate of change of the pitch of the light portions of the light and dark pattern with respect to the inclination angle θs of the surface of the hot-rolled steel sheet S is represented by r and a pitch change rate of the light portions of the light and dark pattern with respect to the height hs of the surface of the hot-rolled steel sheet S is represented by r', r and r' can be geometrically expressed by the following mathematical expressions (6) and (7), respectively, as illustrated in the above-described graphs of FIG. 3B and FIG. 4B.

$$r = \frac{1 - \tan\alpha \cdot \tan\theta s}{1 + \tan\beta \cdot \tan\theta s} \quad (6)$$

$$r' = \frac{1 - hs/hp}{1 - hs/hc} \quad (7)$$

The rate of change of pitch that is actually measured is represented by R, which equals r·r', in which the rate of change r of the pitch with respect to the inclination angle θs of the surface of the hot-rolled steel sheet S is multiplied with the rate of change r' of the pitch with respect to the height hs of the surface of the hot-rolled steel sheet S. That is, the following mathematical expression (8) applies.

$$\frac{1-\tan\alpha\cdot\tan\theta s}{1+\tan\beta\cdot\tan\theta s}\cdot\frac{1-hs/hp}{1-hs/hc}=R \qquad (8)$$

If the above mathematical expression (8) is rearranged, substituting tan θs with hs/L₀ as derived from the above mathematical expression (5), the following mathematical expression (9) applies.

$$\frac{h_S}{L_0}(\tan\alpha+R\tan\beta)=\frac{h_S^2}{L_0^2}\left(\frac{\tan\alpha}{h_P}+\frac{R\tan\beta}{h_C}\right)-h_S\left(\frac{1}{h_P}-\frac{R}{h_C}\right)+1-R \qquad (9)$$

In the above mathematical expression (9), hs is generally much smaller than L₀hp and hs is generally much smaller than L₀hc. Accordingly, if mathematical expression (9) is rearranged with the first term on the right side being treated as zero, the following mathematical expression (10) applies.

$$\frac{1-R}{\tan\alpha+R\tan\beta}=h_S\left(\frac{1}{L_0}-\frac{R/h_C-1/h_P}{\tan\alpha+R\tan\beta}\right) \qquad (10)$$

Noting equivalency between the left side of mathematical expression (10) and the parenthetical expression on the right side of mathematical expression (4), if the symbol L' as expressed in the following mathematical expression (11) is used, the above mathematical expression (10) can be expressed as mathematical expression (12).

$$\frac{1}{L'}=\frac{R/h_C-1/h_P}{\tan\alpha+R\tan\beta} \qquad (11)$$

$$\tan\theta_m=h_S\left(\frac{1}{L_0}-\frac{1}{L'}\right) \qquad (12)$$

If the rate of change r of the pitch with respect to the inclination angle θs of the surface of the hot-rolled steel sheet S cancels out the rate of change r' of the pitch with respect to the height hs of the surface of the hot-rolled steel sheet S, then the rate of change of pitch that is actually measured R=r·r'=1. When R=1, from the above mathematical expression (11), tan θm=0. When tan θm=0, from the above mathematical expression (12), L₀ equals L'. Furthermore, if R=1 is substituted into the above mathematical expression (10), the following mathematical expression (13) applies. That is, with the particular arrangement relationship (the relationship of α, β, hc and hp) with which L₀ satisfies mathematical expression (13), the effects of variations of the sheet angle by the looper 200 completely cancel out.

$$L_0=\frac{\tan\alpha+\tan\beta}{1/h_C-1/h_P} \qquad (13)$$

Even if mathematical expression (13) is not necessarily satisfied, provided the effects of sheet angle variations on measurement errors are within a required accuracy, there is no problem in practice. In hot-rolling finishing rolling, a steepness measurement range is 0 to 5% and measurement accuracy is required to be ±0.2%, which as a proportion of the steepness measurement range is 0.08. If a sheet wave shape is assumed to be a sine wave, the range of variation of the surface angle if the steepness is 5% is −9° to +9°. Therefore, an angle measurement accuracy required to assure the required steepness measurement accuracy is the same proportion, 0.08, of ±9°, which is ±0.72°.

Under practical measurement conditions, variations in the inclination angle θs of the surface of the hot-rolled steel sheet S in accordance with variations of the angle θL of the looper 200 are 0-4°, that is, ±2°. Therefore, there is no problem in practice if apparent values of θm can be suppressed to 0.72° or less, that is, about a third of θs. Below, a process to derive a tolerance range of L', that is, the arrangement conditions α, β, hc and hp, if θm is to be kept to not more than 0.72° is shown.

In order to derive the tolerance range of L₀, it is first assumed that L'=aL₀, giving the following mathematical expression 13.

$$\tan\theta m=hs(1/L_0-1/aL_0)=hs/L_0(1-1/a)=(1-1/a)\tan\theta s \qquad (13)$$

In order to suppress apparent values of θm to 0.72° or less, that is, about a third of θs, the following applies.

$$-1/3\theta s\le\theta m\le1/3\theta s$$

$$-\tan(1/3\theta s)\le\tan\theta m\le\tan(1/3\theta s)$$

Because θs is a small angle, not more than ±2°, the approximation θs≈ tan θs may be applied.

$$-1/3\tan\theta s\le(1-1/a)\tan\theta s\le1/3\tan\theta s$$

$$-1/3\le(1-1/a)\le1/3$$

$$0.75\le a\le1.5$$

That is, a measurement accuracy that is unproblematic in practice may be assured provided 0.75 L₀≤L'≤1.5 L₀. For practical shape measurement, a measurement field in the rolling direction of the order of hundreds of mm to 1 m must be assured. The values of α, β and L₀ vary depending on positions in the measurement field. However, shape measurement that is unaffected by looper alterations may be implemented by selecting the measurement range so as to satisfy the relationship 0.754≤L'≤1.5 L₀.

Considering L', because θs is a very small angle of not more than 0.72°, R≈1. Therefore, the approximation in mathematical expression (14) is acceptable.

$$L'=\frac{\tan\alpha+R\tan\beta}{R/h_C-1/h_P}\approx\frac{\tan\alpha+\tan\beta}{1/h_C-1/h_P} \qquad (14)$$

To summarize the findings so far, a measurement accuracy that is unproblematic in practice may be assured if the following mathematical expression (1) is satisfied.

$$0.75L_0\le\frac{\tan\alpha+\tan\beta}{1/h_C-1/h_P}\le1.5L_0 \qquad (1)$$

—5. Calibration Sheet Disposition Method—

When shapes are to be measured by a pattern projection method, a flat calibration sheet must be equipped at the measurement position in advance and pattern pitch measurements performed thereon. In usual rolling, the looper angle varies from 0° to 25° and the sheet angle varies from approximately 0° to 4°. To minimize errors, the sheet angle variation range may be set to ±2° and the effects of looper angle variations kept to not more than 0.72° if the calibration (standard pitch measurement) is performed in a state in which the sheet at a central portion is tilted by 2° from the pass line (the line LC) toward the rolling stand at the opposite side from the side at which the looper 200 is equipped. To improve calibration accuracy, the sheet may be tilted from 0° to 4° and standard pitches measured and averaged.

According to the present exemplary embodiment, measurement accuracy may be assured and endurance between the finishing stands may be assured by adding the following conditions to mathematical expression (1).

Figure 4C:
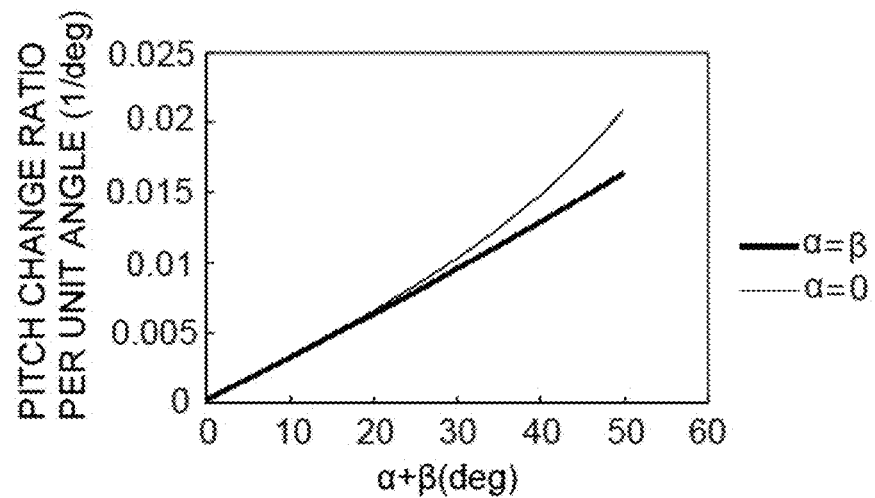
FIG. 4C is a graph illustrating a relationship between an arrangement angle $\alpha+\beta$ and a rate of change of pitch per unit angle.

If $20° \leq \alpha+\beta \leq 90°$, then $hp/hc \geq 1.133$ and $hc \geq 1000$ mm
If $-90° \leq \alpha+\beta \leq -20°$, then $hc/hp \geq 1.133$ and $hp \geq 1000$ mm The reasoning behind this is described below. Regarding the arrangement angles $\alpha$ and $\beta$, according to the theory of the pattern projection method, the larger $|\alpha+\beta|$ is, the greater the rate of change of pitch with respect to angle changes and the greater the sensitivity of angle detection (FIG. 4C). FIG. 4C illustrates calculated values of the rate of change of pitch per degree of steel sheet surface angle, calculated from mathematical expression (4). In a case of measuring pitches by image processing, a pitch change of 0.5% (0.005) is sufficient for measurement. Therefore, to obtain an angle measurement resolution of less than 1°, it is necessary for $|\alpha+\beta|$ to be at least 20°. The spacing between the finishing stands is 2-3 m and the vicinity of the steel sheet surface is at a high temperature due to the effects of radiant heating. Therefore, the arrangement positions must be at least 1-1.5 m distant above the surface in order to assure endurance. Given the above, hc and hp are both at least 1 m and $|\alpha+\beta| \leq 90°$. It is common for the distance between the rolling stands to be 5-6 m. Therefore, $L_0$ is around 1-3 m. A difference is applied between hc and hp so as to cancel out the effects of looper angle alterations. This difference is dependent on $\alpha+\beta$ and is proportionally smallest at 20°, the smallest angle. Below, hp is expressed as bhc in mathematical expression (13), and a range that can provide the ratio b when $\alpha+\beta$ equals 20° is calculated.

(tan $\alpha$+tan $\beta$)/(1/$hc$-1/$bhc$)=$L_0$ tan $\alpha$+tan $\beta$=$L_0/hc$(1-1/$b$)

When $\alpha+\beta=20°$, if it is understood that tan $\alpha$+tan $\beta$ is between 0.352 (2×tan 10°) and 0.364 (tan 20°), then, considering that $L_0/hc \leq 3$, $b \geq 1/(1-2/3 \tan 10°)=1.133$. That is, a difference of at least approximately ×1.133 must be applied.

From the reasoning described above, in the flatness measurement device 100 according to the present exemplary embodiment, the projection unit 1 and the image capture unit 2 are arranged so as to satisfy the above mathematical expression (1). Hence, even when the angle $\theta$L of the looper 200 changes (and consequently the inclination angle $\theta$s and height hs of the surface of the hot-rolled steel sheet S change), the rate of change r of the pitch with respect to the inclination angle $\theta$s of the surface of the hot-rolled steel sheet S and the rate of change r' of the pitch with respect to the height hs of the surface of the hot-rolled steel sheet S counteract one another. Therefore, the pitch of the light portions of the light and dark pattern in the pattern image that is captured is resistant to change. Thus, the flatness of the hot-rolled steel sheet S traveling between the rolling stands, between which the looper 200 is equipped, may be measured accurately irrespective of the looper angle 200.

Figure 5:
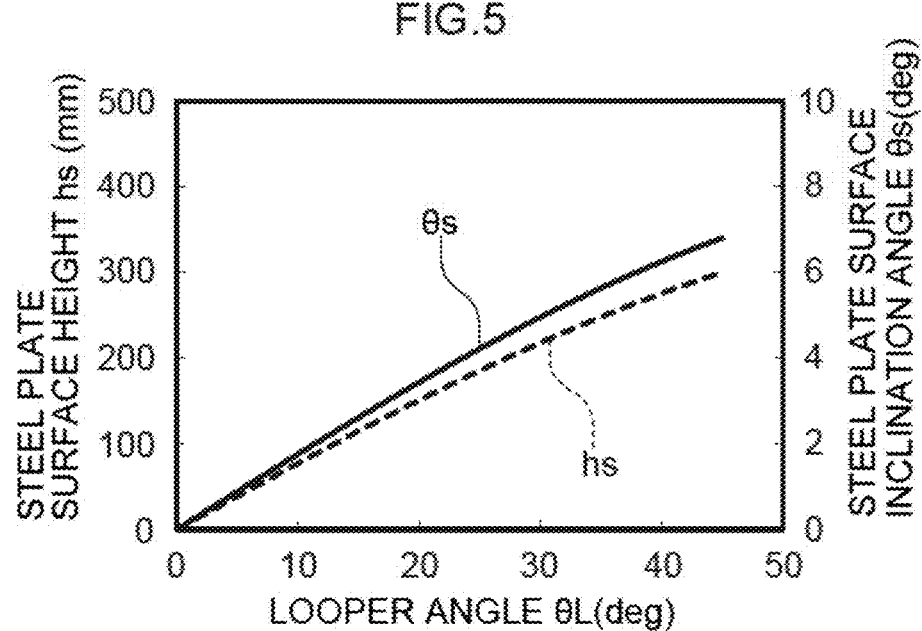
FIG. 5 is a graph illustrating an example of relationships between a looper angle $\theta L$ and a height hs and inclination angle $\theta s$ of hot-rolled steel sheet passing along a sheet passage route.

FIG. 5 is a graph illustrating an example of the relationships between the angle $\theta$L of the looper 200 and the height hs and inclination angle t$\theta$s of the surface of the hot-rolled steel sheet S passing along the sheet passage route. The graph illustrated in FIG. 5 shows the results of calculations based on $L_0$=2515 mm and on disposition conditions of the rolling stands F6 and F7 and the looper 200. As shown in FIG. 5, when the looper angle $\theta$L is changed, the height hs and inclination angle $\theta$s of the surface of the hot-rolled steel sheet S change simultaneously.

Figure 6:
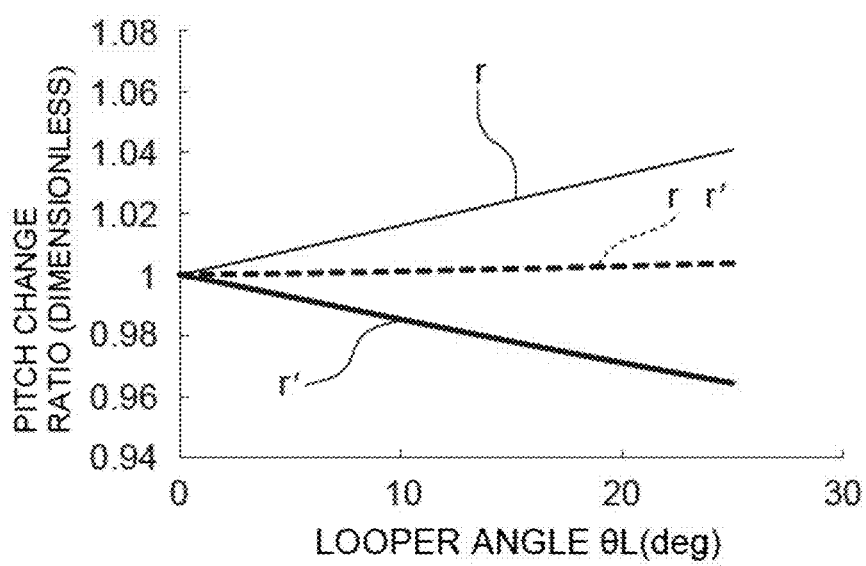
FIG. 6 is a graph illustrating relationships, under the conditions illustrated in FIG. 5, between the looper angle $\theta L$ and a rate of change r of the pitch of light portions of a periodic light and dark pattern with respect to the inclination angle of the hot-rolled steel sheet surface, a rate of change r' of the pitch of the light portions of the periodic light and dark pattern with respect to the height of the hot-rolled steel sheet surface, and r·e.

FIG. 6 is a graph illustrating relationships, under the conditions illustrated in FIG. 5, between the looper angle $\theta$L and the rate of change r of the pitch of the light portions of the light and dark pattern (see the aforementioned mathematical expression (6)), the rate of change r' (see the aforementioned mathematical expression (7)), and r·r'. The graph illustrated in FIG. 6 shows the results of calculations based on the conditions illustrated in FIG. 5 and on conditions that satisfy the above mathematical expression (1): $\alpha=28°$, $\beta=-3°$, hc=2300 mm and hp=4300 mm.

As shown in FIG. 6, although the rate of change r of the pitch of the light portions of the light and dark pattern with respect to the inclination angle $\theta$s of the surface of the hot-rolled steel sheet S and the rate of change r' of the pitch of the light portions of the light and dark pattern with respect to the height hs both change when the looper angle $\theta$L is changed, the overall rate of change r·r' is substantially at 1 irrespective of the looper angle $\theta$L.

Herebelow, examples of results of actual measurements of flatness of a hot-rolled steel sheet S using the flatness measurement device 100 according to the present exemplary embodiment are described.

Layout Examples

Figure 7:
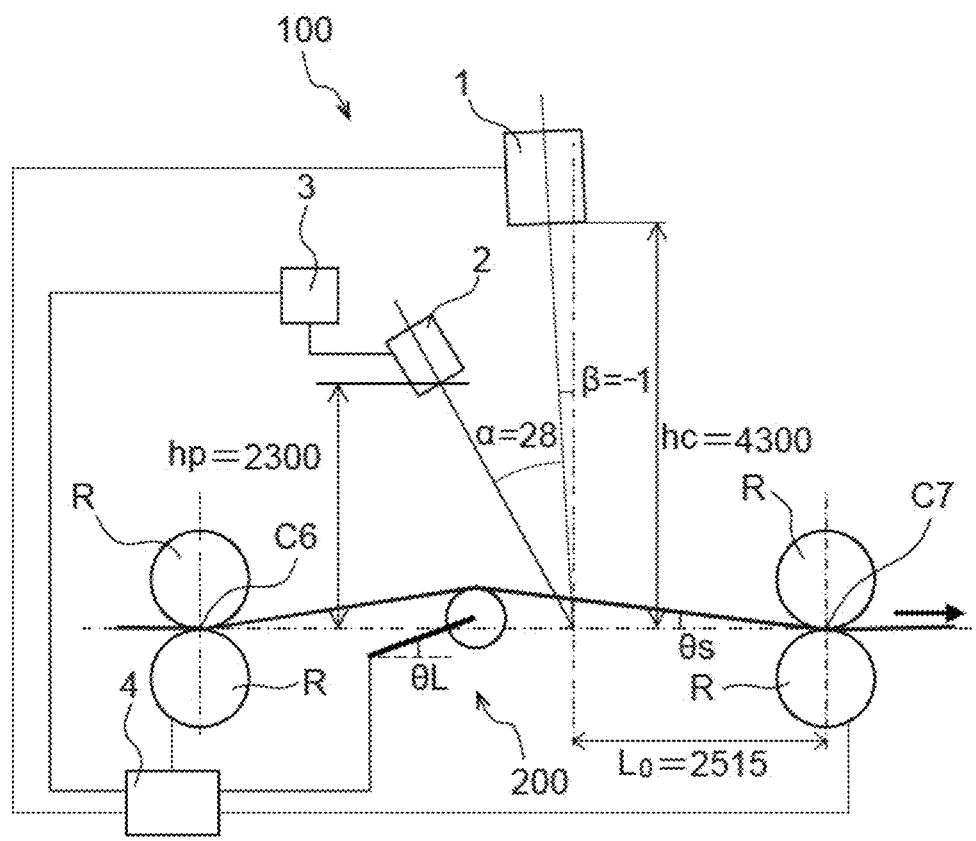
FIG. 7 is a schematic diagram illustrating a layout example of measurement at the downstream side of the looper.
Figure 8:
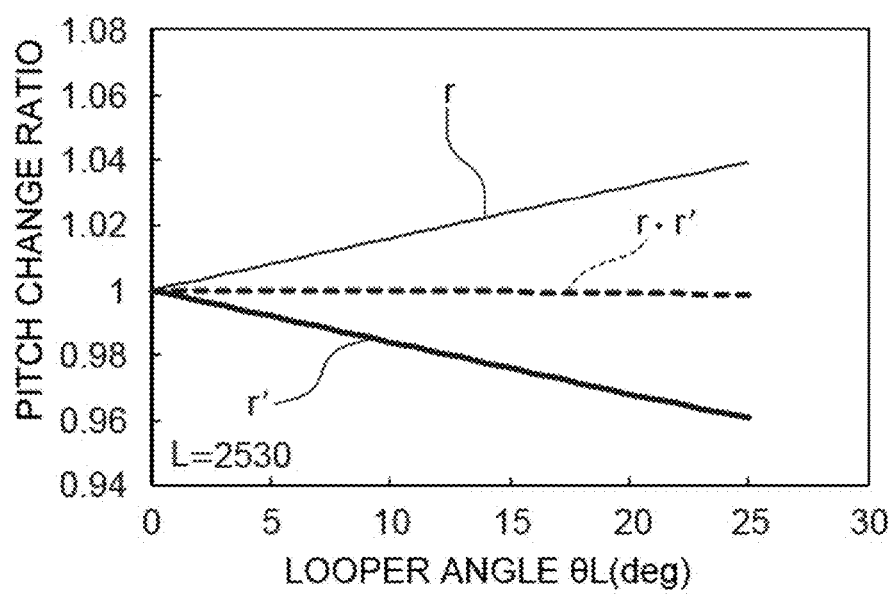
FIG. 8 is a graph illustrating the relationships, in the layout according to FIG. 7, between the looper angle $\theta L$ and the rates of change r and r' of the pitch of the light portions of the periodic light and dark pattern and r·r'.

For reference, FIG. 7 to FIG. 14 illustrate layout examples (and calculation results) in which $L_0$ substantially satisfies mathematical expression (13). FIG. 7 is a layout example of measurement downstream of the looper 200. The arrangement angle $\alpha$ of the image capture unit 2 is 28° and the arrangement angle $\beta$ of the projection unit 1 is −1°. FIG. 8 is a graph illustrating the relationships for the layout of FIG. 7 between the angle $\theta$L of the looper 200 and the rates of change r, r' and r·r' of the pitch of the light portions of the light and dark pattern. The graph illustrated in FIG. 8 shows the results of calculations under conditions that satisfy the above mathematical expression (1): $\alpha=28°$, $\beta=-1°$, hc=2300 mm and hp=4300 mm. The value of $L_0$ satisfying mathematical expression (13) is 2515 mm. A value of $L_0$ that substantially satisfies mathematical expression (13) is 2530 mm=L.

In practice, the device was arranged in the layout example illustrated in FIG. 7 and a test to verify the effects was carried out. Because of interference with existing equipment, the central axis of the camera was at $\beta=-3°$. In accordance with the measurement field being set to a range of 200 mm to upstream and 400 mm to downstream, a range within images was a range in the whole of which mathematical expression (1) may be satisfied.

$$L = \frac{\tan\alpha + \tan\beta}{1/h_C - 1/h_P}$$

Accordingly, the inequality in mathematical expression (1) is 0.75 $L_0 \leq L \leq 1.5$ $L_0$, which is rearranged to 0.75≤L/$L_0$≤1.5. Table 1 shows calculated values of L/$L_0$ for respective rolling direction positions. If the rolling direction position is 200 mm upstream (−200 mm), L/$L_0$=0.79 and if the rolling direction position is 400 mm downstream (+400 mm), $L/L_0=1.25$. Thus, the conditions of mathematical expression (1) are satisfied over the whole range of Table 1.

TABLE 1

| Rolling direction position | α | β | L | $L_0$ | $L/L_0$ |
|---|---|---|---|---|---|
| −200 mm | 24.0° | −0.3° | 2169 mm | 2715 mm | 0.79 |
| 0 mm | 28.0° | −3.0° | 2370 mm | 2515 mm | 0.94 |
| +400 mm | 35.2° | −8.2° | 2775 mm | 2215 mm | 1.25 |

Figure 9:
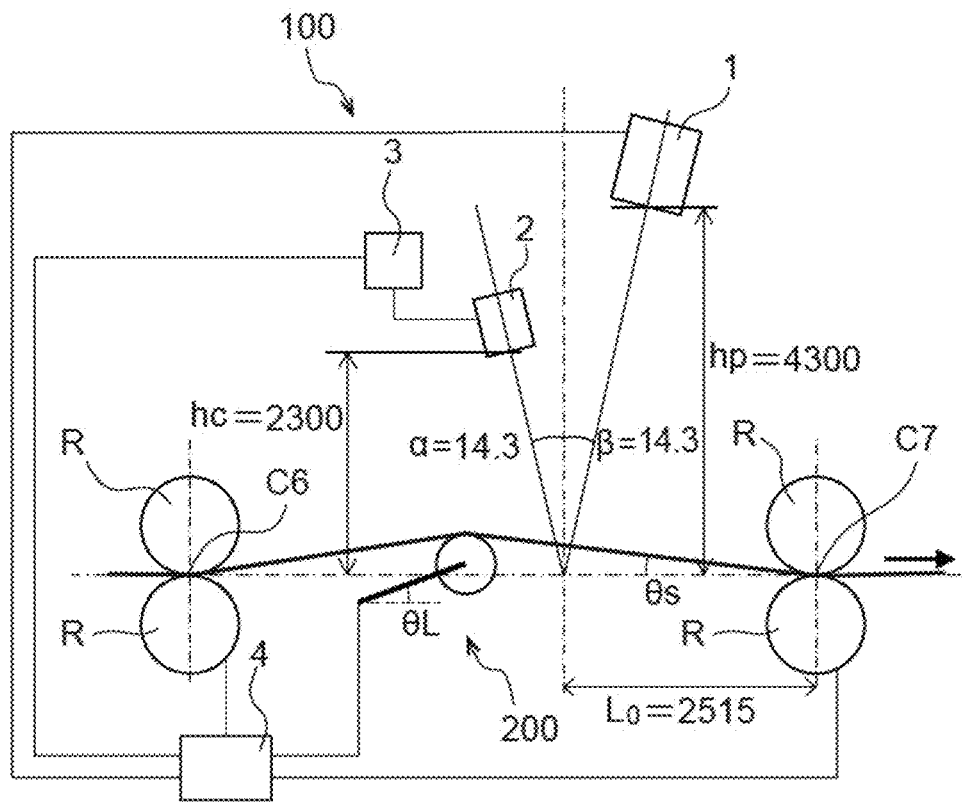
FIG. 9 is a schematic diagram illustrating a layout example of measurement at the downstream side of the looper.
Figure 10:
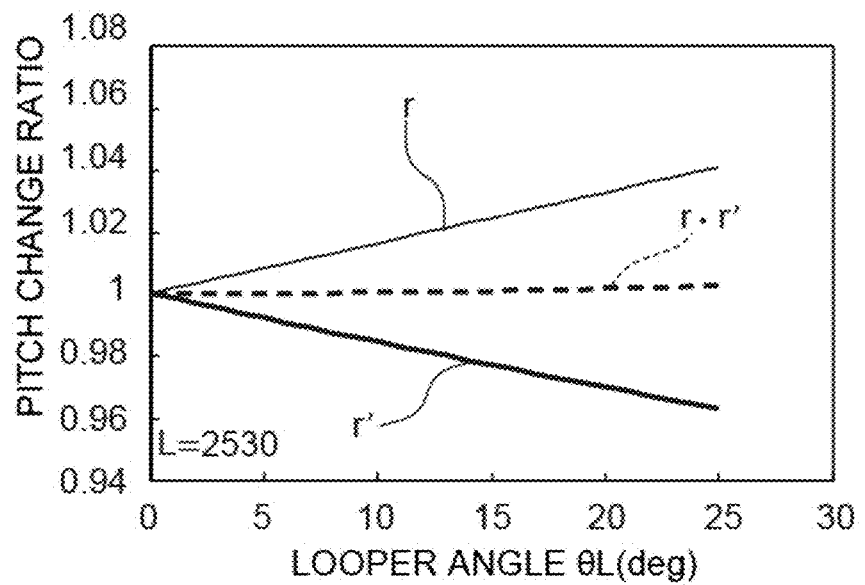
FIG. 10 is a graph illustrating the relationships, in the layout according to FIG. 9, between the looper angle $\theta L$ and the rates of change r and r' of the pitch of the light portions of the periodic light and dark pattern and r·r'.

FIG. 9 is a layout example of measurement downstream of the looper 200, in which the arrangement angles of the projection unit 1 and the image capture unit 2 are different from FIG. 7. The arrangement angle α of the image capture unit 2 is 14.3° and the arrangement angle β of the projection unit 1 is 14.3°. FIG. 10 is a graph illustrating the relationships for the layout of FIG. 9 between the angle θL of the looper 200 and the rates of change r, r' and r·r' of the pitch of the light portions of the light and dark pattern. The graph illustrated in FIG. 10 shows the results of calculations under conditions that satisfy the above mathematical expression (1): α=14.3°, β=14.3°, hc=2050 mm and hp=4300 mm. The value of $L_0$ satisfying mathematical expression (13) is 2515 mm. A value of $L_0$ that substantially satisfies mathematical expression (13) is 2520 mm=L. Even though the arrangement angles of the projection unit 1 and the image capture unit 2 have changed, given that tan α+tan β is the same, the conditions of mathematical expression (1) are satisfied.

Figure 11:
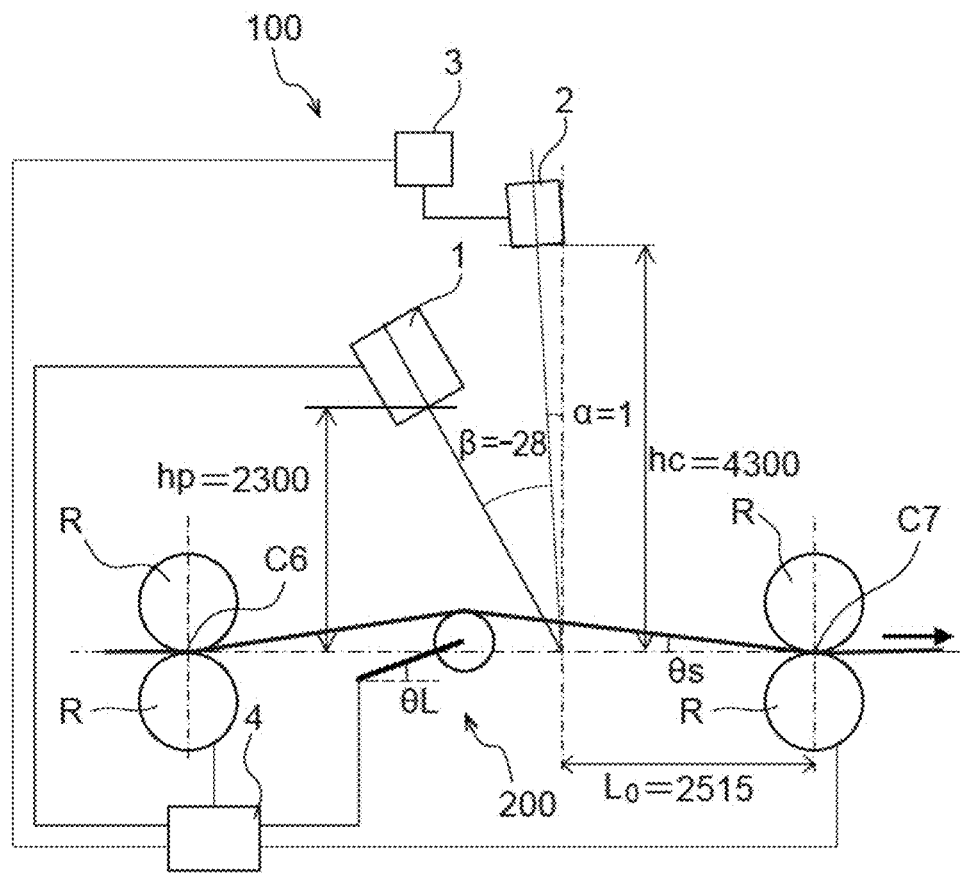
FIG. 11 is a schematic diagram illustrating a layout example of measurement at the downstream side of the looper.
Figure 12:
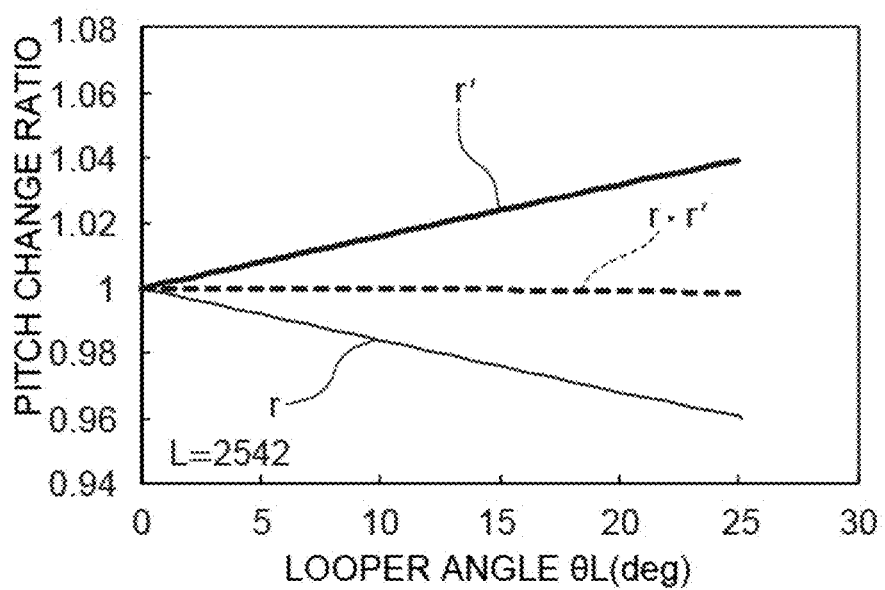
FIG. 12 is a graph illustrating the relationships, in the layout according to FIG. 11, between the looper angle $\theta L$ and the rates of change r and r' of the pitch of the light portions of the periodic light and dark pattern and r·r'.

FIG. 11 is a layout example of measurement downstream of the looper 200, in which the heights of the projection unit 1 and the image capture unit 2 in FIG. 7 are exchanged. The arrangement angle α of the image capture unit 2 is 1° and the arrangement angle β of the projection unit 1 is −28°. FIG. 12 is a graph illustrating the relationships for the layout of FIG. 11 between the angle θL of the looper 200 and the rates of change r, r' and r·r' of the pitch of the light portions of the light and dark pattern. The graph illustrated in FIG. 12 shows the results of calculations under conditions that satisfy the above mathematical expression (1): α=1°, β=−28°, hc=4300 mm and hp=2300 mm. The value of $L_0$ satisfying mathematical expression (13) is 2515 mm. A value of $L_0$ that substantially satisfies mathematical expression (13) is 2542 mm=L.

Figure 13:
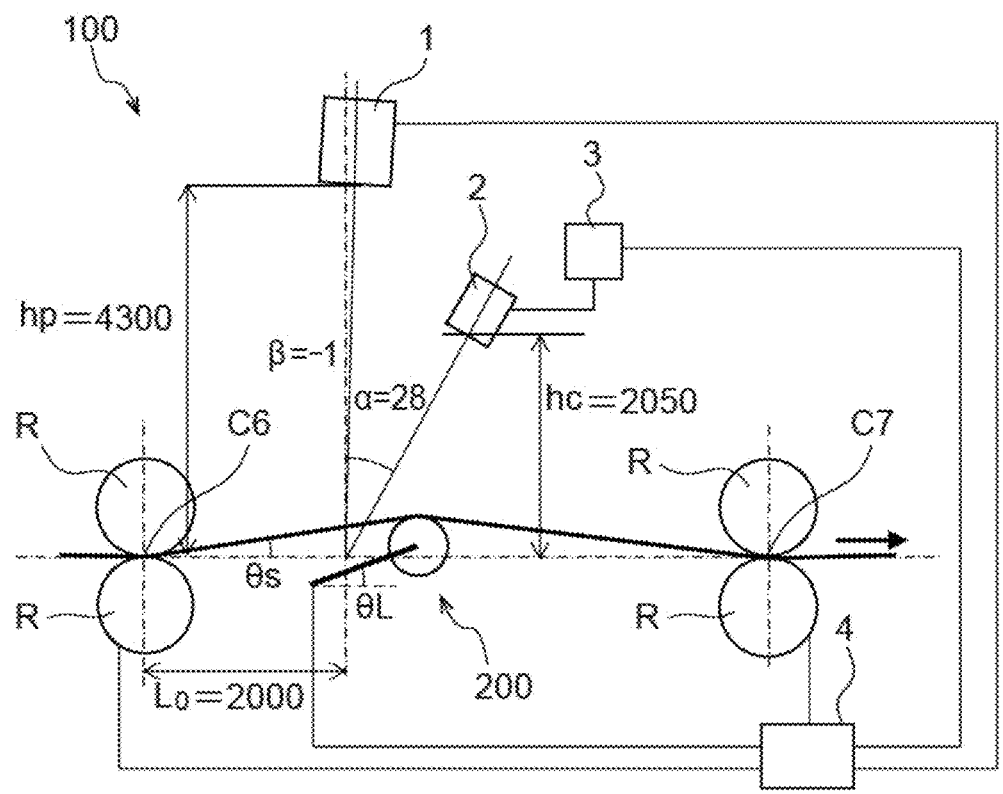
FIG. 13 is a schematic diagram illustrating a layout example of measurement at the downstream side of the looper
Figure 14:
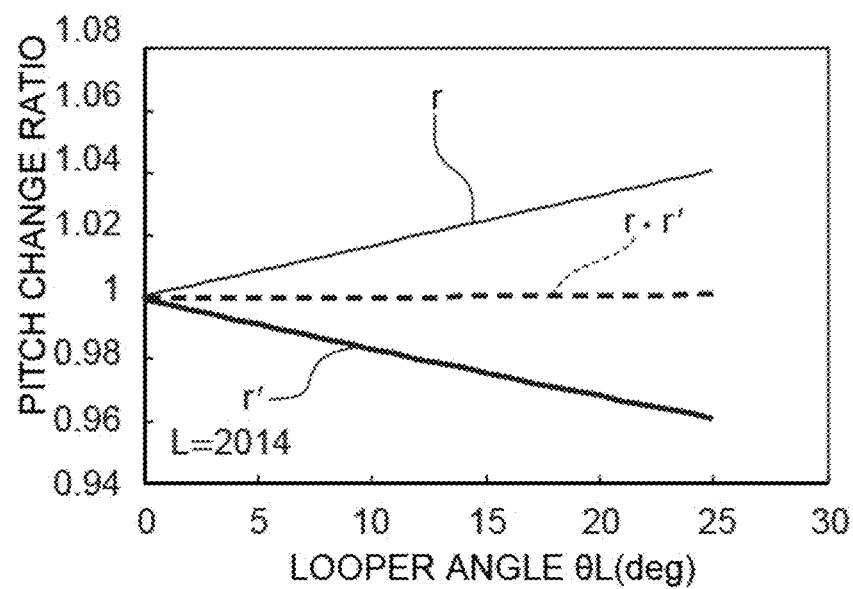
FIG. 14 is a graph illustrating the relationships, in the layout according to FIG. 13, between the looper angle $\theta L$ and the rates of change r and r' of the pitch of the light portions of the periodic light and dark pattern and r·r'.

FIG. 13 is a layout example of measurement upstream of the looper 200. The arrangement angle α of the image capture unit 2 is 28° and the arrangement angle β of the projection unit 1 is −1°. FIG. 14 is a graph illustrating the relationships for the layout of FIG. 13 between the angle θL of the looper 200 and the rates of change r, r' and r·r' of the pitch of the light portions of the light and dark pattern. The graph illustrated in FIG. 14 shows the results of calculations under conditions that satisfy the above mathematical expression (1): α=28°, β=−1°, hc=2050 mm and hp=4300 mm. The value of $L_0$ satisfying mathematical expression (13) is 2000 mm. A value of $L_0$ that substantially satisfies mathematical expression (13) is 2014 mm=L.

As illustrated in FIG. 8, FIG. 10, FIG. 12 and FIG. 14, although the rate of change r of the pitch of the light portions of the light and dark pattern with respect to the inclination angle θs of the surface of the hot-rolled steel sheet S and the rate of change r' of the pitch of the light portions of the light and dark pattern with respect to the height hs both change when the looper angle θL is changed, the overall rate of change re is substantially at 1 irrespective of the looper angle θL.

—Calibration Sheet Measurement Test—

Firstly, using the flatness measurement device 100 in which the projection unit 1 and image capture unit 2 were arranged so as to satisfy the above mathematical expression (1), a standard sheet (calibration sheet) with a flat surface shape was equipped on the sheet passage route of the hot-rolled steel sheet S, and a test was conducted to alter the angle θL of the looper 200 and calculate longitudinal direction pitches of the light portions of the light and dark pattern for each value of the angle θL.

Figures 15A, 15B:
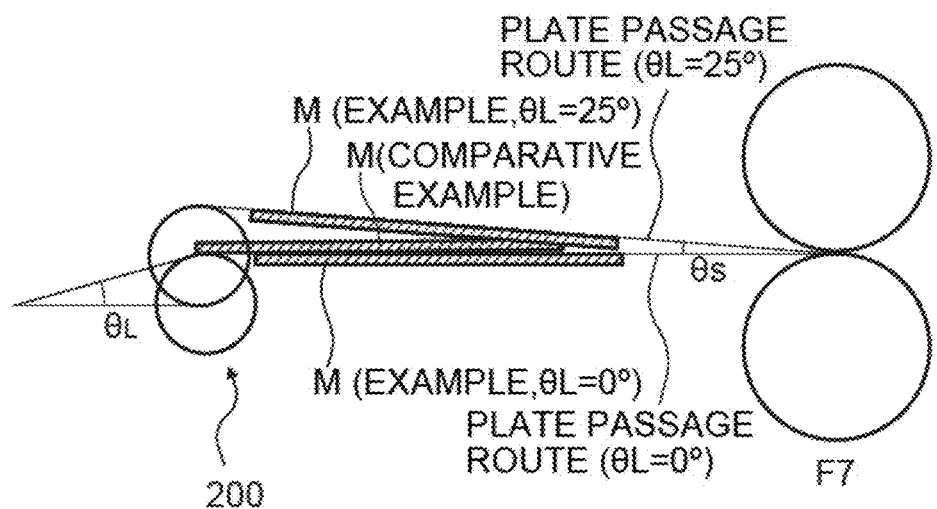
FIG. 15A is a descriptive diagram schematically illustrating states of disposition of a standard sheet in a test overview of a standard sheet measurement test.
FIG. 15B is a graph illustrating looper angles θL and inclination angles θs of the standard sheet surface that are specified for Examples and a Comparative Example.

FIG. 15A is a descriptive diagram schematically illustrating states of disposition of the standard sheet in a test overview of the standard sheet measurement test. FIG. 15B is a graph illustrating looper angles θL and inclination angles θs of the standard sheet surface that are specified for Examples and a Comparative Example. FIG. 15C is a graph illustrating an example of a captured pattern image and specified shape measurement lines, in which the lateral direction is the sheet width direction and the longitudinal direction (the Y direction) is the sheet length direction.

In the Examples illustrated in FIG. 15A, the standard sheet M is equipped such that the upper face thereof lies along the sheet passage route of the hot-rolled steel sheet S. In the Comparative Example, the standard sheet M is equipped such that the upper face thereof deviates from the sheet passage route of the hot-rolled steel sheet S. An LED light source equipped with a plurality of LEDs was used as the projection unit 1 and projected a staggered pattern serving as the light and dark pattern onto the surface of the standard sheet M. As illustrated in 15C, shape measurement lines L1 to L3 extending in the longitudinal direction of the staggered pattern image that was captured (the Y direction) were specified, average pixel density distributions along each of the shape measurement lines L1 to L3 were calculated, and the distribution of longitudinal direction pitches of the light portions of the light and dark pattern along each of the shape measurement lines L1 to L3 was calculated by phase analysis. The shape measurement line L1 was specified so as to pass through pixels corresponding to a width direction central portion of the standard sheet M (corresponding to a width direction central portion of the hot-rolled steel sheet S); the shape measurement lines L2 and L3 were specified so as to pass through pixels corresponding to positions respectively distant from the shape measurement line L1 by 650 mm in the width direction of the standard sheet M.

Figure 16A:
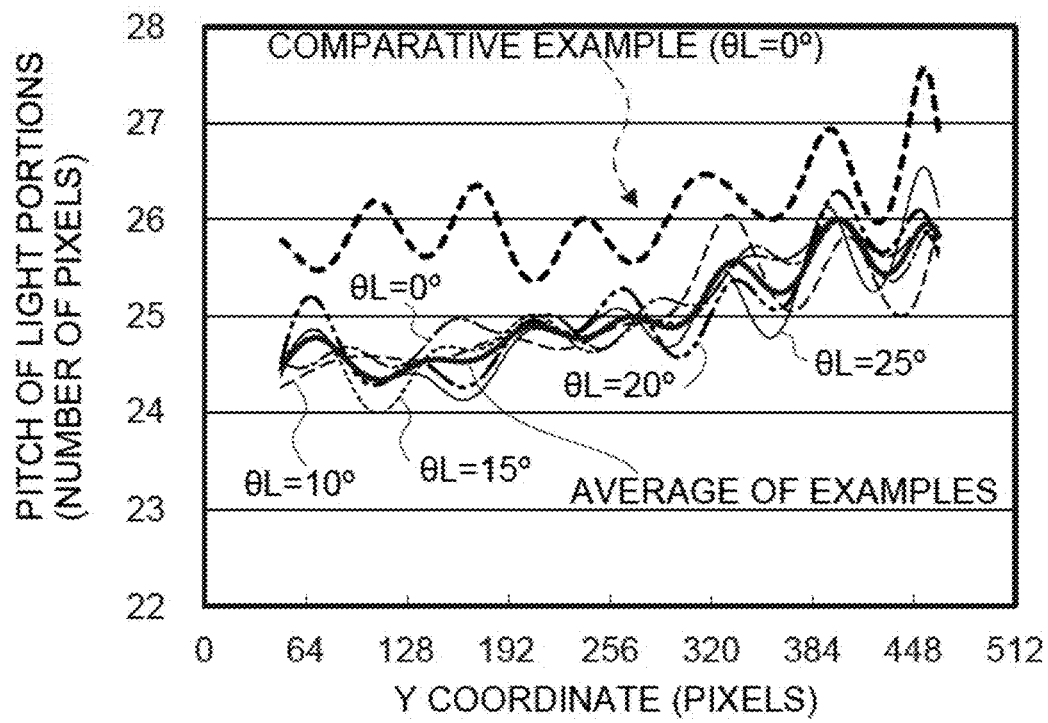
FIG. 16A is a graph illustrating distributions of longitudinal direction pitches of light portions calculated for a shape measurement line L1 in a light and dark pattern, for the Examples and Comparative Example illustrated in FIG. 15A to FIG. 15C.
Figure 16B:
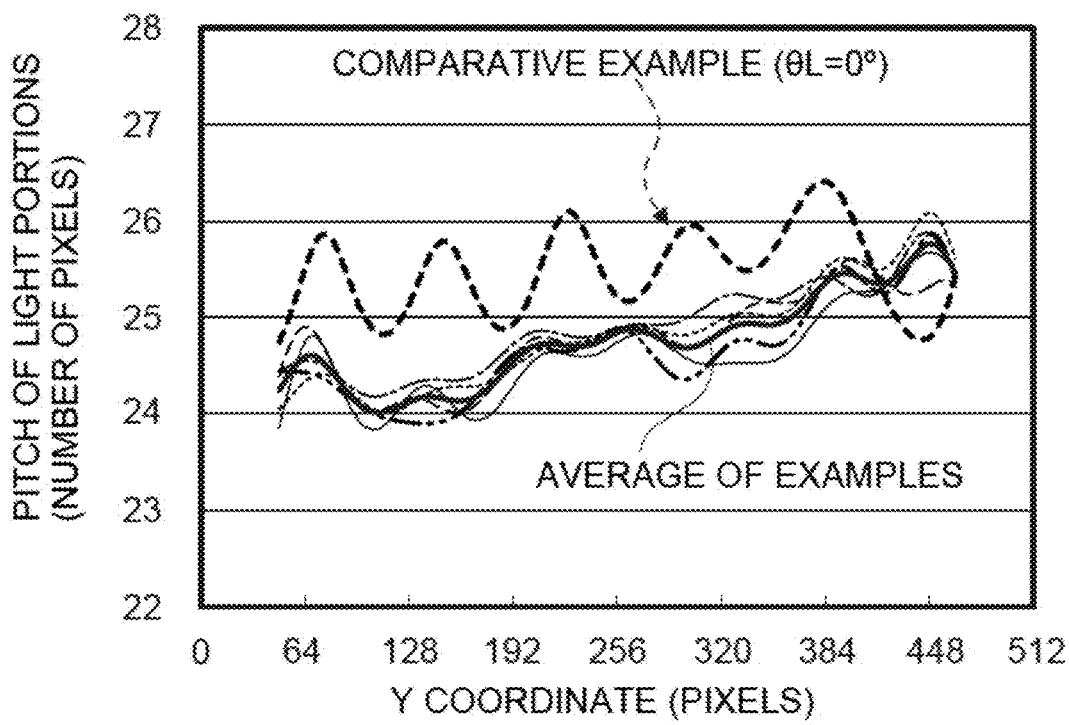
FIG. 16B is a graph illustrating distributions of longitudinal direction pitches of light portions calculated for a shape measurement line L2 in the light and dark pattern, for the Examples and Comparative Example illustrated in FIG. 15A to FIG. 15C.

FIG. 16A is a graph illustrating the distributions of the longitudinal direction pitches of the light portions calculated for the shape measurement line L1 in the light and dark pattern, for the Examples and Comparative Example illustrated in FIG. 15A to FIG. 15C. FIG. 16B is a graph illustrating the pitches of the light portions similarly calculated for the shape measurement line L2, and FIG. 16C is a graph illustrating the pitches of the light portions similarly calculated for the shape measurement line L3.

Figure 16C:
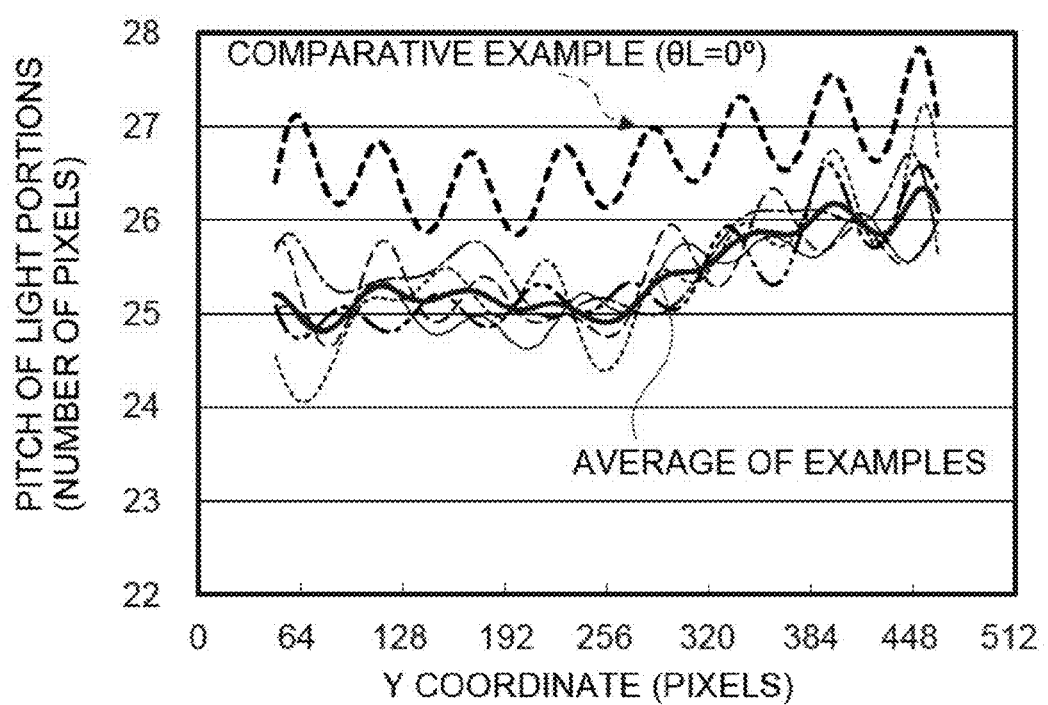
FIG. 16C is a graph illustrating distributions of longitudinal direction pitches of light portions calculated for a shape measurement line L3 in the light and dark pattern, for the Examples and Comparative Example illustrated in FIG. 15A to FIG. 15C.

In FIG. 16A to FIG. 16C, the Comparative Example is represented by a thick dotted line and the Examples are represented by other lines. A single-dot chain line represents θL=0°, a dotted line with a long pitch represents θL=10°, a dotted line with a short pitch represents θL=15°, a two-dot chain line represents θL=20°, and a thin solid line represents θL=25°. A thick solid line represents the average from θL=0° to θL=25°.

As illustrated in FIG. 16A to FIG. 16C, in the Examples (the graph represented by a solid line), even though the looper angle θL is changed, substantially constant pitches of the light portions are obtained. In contrast, in the Comparative Example (the graph represented by a broken line), the pitches of the light portions are different from the Examples.

Thus it can be seen that, according to the flatness measurement device 100 according to the present exemplary embodiment, there is no need to prepare a plurality of pitches (calibration values) of the light portions in the light and dark pattern from a plurality of standard sheets M corresponding to looper angles θL (i.e., corresponding to heights hs and inclination angles θs of the surface of the hot-rolled steel sheet S).

—Hot-Rolled Steel Sheet Measurement Test—

Using the flatness measurement device 100 in which the projection unit 1 and image capture unit 2 were arranged so as to satisfy the above mathematical expression (1), the flatness measurement device 100 was installed between the sixth rolling stand F6 and seventh rolling stand F7 of a finishing mill of a hot-rolled steel sheet production line (see FIG. 2A), the angle θL of the looper 200 was set to approximately 10°, and the flatness (steepness) of a hot-rolled steel sheet S that had been rolled was measured. At this time, a pair of upper and lower work rolls R and R equipped at the seventh rolling stand F7 were opened up. The same type of flatness measurement device was situated at the exit side of the finishing mill (the exit side of the seventh rolling stand F7), and measured the flatness (steepness) of the hot-rolled steel sheet S that had been rolled.

Figure 17A:
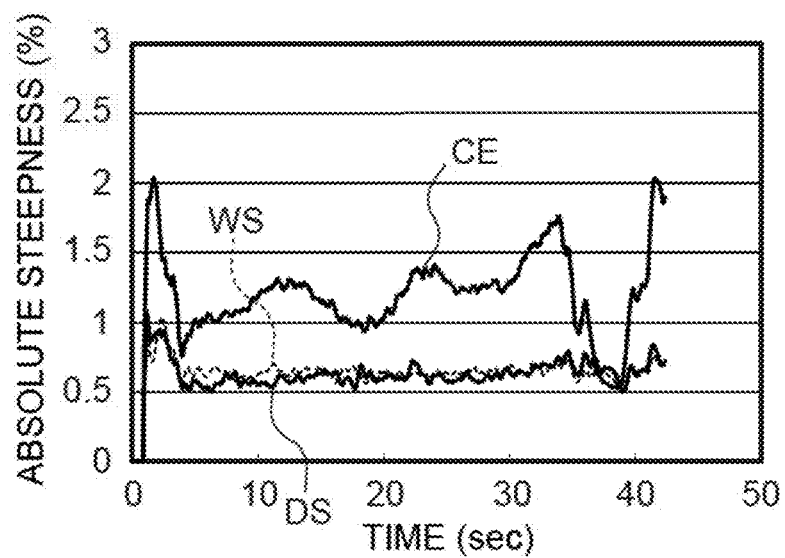
FIG. 17A is a graph illustrating steepnesses measured by a flatness measurement device situated between a sixth rolling stand and a seventh rolling stand in an example of results of measurements of flatness (steepness) of hot-rolled steel sheet.
Figure 17B:
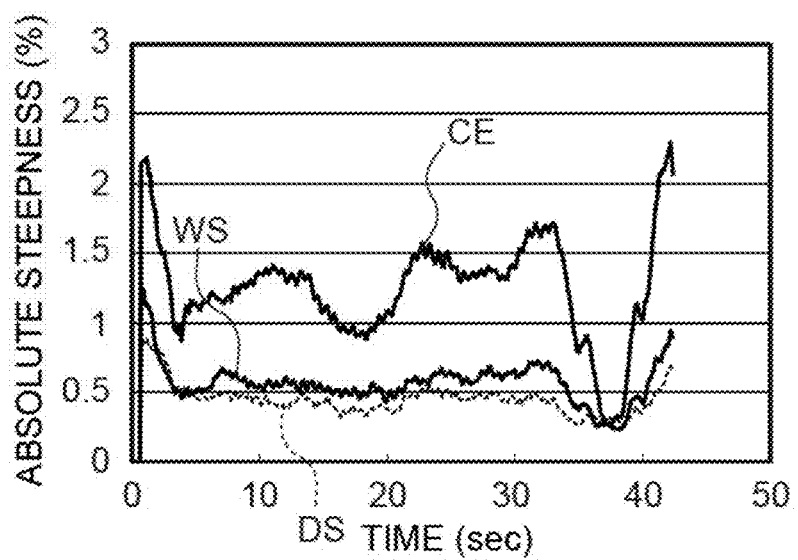
FIG. 17B is a graph illustrating steepnesses measured by a flatness measurement device situated at the exit side of the seventh rolling stand in an example of results of measurements of flatness (steepness) of hot-rolled steel sheet.

FIG. 17A is a graph illustrating the steepnesses (i.e., steepnesses of a width direction central portion, left side edge vicinity and right side edge vicinity of the hot-rolled steel sheet S) measured by the flatness measurement device 100 situated between the sixth rolling stand F6 and the seventh rolling stand F7 in this example of results of measurements of flatness (steepness) of the hot-rolled steel sheet S. FIG. 17B is a graph illustrating the steepnesses (i.e., steepnesses of the width direction central portion, left side edge vicinity and right side edge vicinity of the hot-rolled steel sheet S) measured by the flatness measurement device situated at the exit side of the seventh rolling stand F7. In FIG. 17A and FIG. 17B, CE represents the steepness of the width direction central portion of the hot-rolled steel sheet S, DS represents the steepness of the left side edge vicinity of the hot-rolled steel sheet S, and WS represents the steepness of the right side edge vicinity of the hot-rolled steel sheet S.

Because the pair of upper and lower work rolls R and R equipped at the seventh rolling stand F7 were opened up, the hot-rolled steel sheet S was not rolled by the seven rolling stand F7. Therefore, it can be seen that if the steepness measured between the sixth rolling stand F6 and the seventh rolling stand F7 and the steepness measured at the exit side of the seventh rolling stand F7 can be accurately measured, the values can be expected to be equal.

As shown in FIG. 17A and FIG. 17B, the two sets of steepness measurement values match up relatively well. Thus it can be seen that, according to the flatness measurement device 100 according to the present exemplary embodiment, even though the flatness is measured between the sixth rolling stand F6 and the seventh rolling stand F7 where the looper 200 is equipped, the flatness may be measured with equivalent accuracy to a case in which the flatness is measured at the exit side of the seventh rolling stand F7 where the looper 200 does not affect measurements (where the looper 200 is not equipped).

—7. Production Method for Steel Sheet—

In FIG. 2A, a production method for steel sheet according to the present exemplary embodiment includes a step of rolling a steel bloom, which has been roughed by a roughing mill 300, at the rolling stands F1 to F7 that constitute the finishing mill, and a step of cooling the rolled steel sheet S in a cooling zone 400. In this production method for steel sheet, one or both of rolling conditions at the seventh rolling stand F7 and cooling conditions at the cooling zone 400 are controlled on the basis of the results of measurements of flatness of the steel sheet S by the flatness measurement method described above.

The control of rolling conditions at the seventh rolling stand F7 and cooling conditions at the cooling zone 400 is implemented by the control device 4 described in FIG. 2B and the like. Further control of the rolling stand F6, the looper 200 and the like may also be implemented by the control device 4.

—8. Effects of Applying the Flatness Measurement Method to Steel Sheet Production—

According to the method for measuring the flatness of steel sheet according to the present exemplary embodiment, the flatness of the steel sheet S may be accurately measured without being affected by alterations of the looperangle 200. Therefore, a sheet with excellent flatness may be reliably produced by controlling rolling conditions at the rolling stand F7 and cooling conditions at the cooling zone 400 on the basis of the results of measurements of flatness. Control using this kind of flatness meter is described in, for example, JP-A No. H11-104721.

The disclosures of Japanese Patent Application No. 2013-101935 filed May 14, 2013 are incorporated into the present specification by reference in their entirety.

All references, patent applications and technical specifications cited in the present specification are incorporated by reference into the present specification to the same extent as if the individual references, patent applications and technical specifications were specifically and individually described as being incorporated by reference.

The invention claimed is:

1. A method for measuring flatness of a plate material, comprising:
  acquiring a pattern image by
    projecting a light and dark pattern composed of light portions and dark portions onto a surface of the plate material that is traveling between adjacent rolling stands from a projection unit situated between the rolling stands, and
    capturing an image of the light and dark pattern with an image capture unit situated between the rolling stands; and
  measuring the flatness of the plate material by analyzing the acquired pattern image,
wherein if
  $L_0$ represents a distance in a horizontal direction between an intersection of respective optical axes of the projection unit and the image capture unit and, of the adjacent rolling stands, the rolling stand that is disposed at the opposite side of the intersection with respect to a looper that controls tension of the plate material between the rolling stands,
  $\alpha$ represents an angle formed between a vertical direction and a straight line formed by projecting the optical axis of the image capture unit onto a plane that contains a direction parallel to a rolling direction and the vertical direction, a value of a being positive if the optical axis of the image capture unit is inclined from the vertical direction toward the looper side,
  $\beta$ represents an angle formed between the vertical direction and a straight line formed by projecting the optical axis of the projection unit onto the plane, a value of $\beta$ being positive if the optical axis of the projection unit is inclined from the vertical direction toward the rolling stand side, hc represents a distance in the vertical direction between a pass line, which is a straight line passing through crest points of respective lower side work rolls of pairs of upper and lower work rolls that are respectively disposed at the adjacent rolling stands, and an image principal point of a lens of the image capture unit, and hp represents a distance in the vertical direction between the pass line and an image principal point of a lens of the projection unit, then $L_0$, $\alpha$, $\beta$, hc and hp satisfy the following mathematical expression (1)

$$0.75L_0 \leq \frac{\tan\alpha + \tan\beta}{1/h_C - 1/h_P} \leq 1.5L_0. \quad (1)$$

2. The method for measuring flatness of a plate material according to claim 1, wherein
if $20°\leq\alpha+\beta\leq90°$, then hp/hc≥1.133 and hc≥1000 mm are satisfied, and
if $-90°\leq\alpha+\beta\leq-20°$, then hc/hp≥1.133 and hp≥1000 mm are satisfied.

3. The method for measuring flatness of a plate material according to claim 1, wherein a standard pitch measurement is implemented in a state in which a calibration plate is tilted by 2° relative to the straight line passing through the crest points of the lower side work rolls.

4. A production method for steel plate, comprising:
rolling a steel slab, which has been rough rolled by a roughing mill, at rolling stands that constitute a finishing mill line; and
cooling the rolled steel plate at a cooling zone,
wherein at least one of a rolling condition at the rolling stands and a cooling condition at the cooling zone is controlled on the basis of the steel sheet flatness measured by the method for measuring flatness recited in claim 1.

5. A device for measuring flatness of a plate material, comprising:
a projection unit situated between adjacent rolling stands, the projection unit projecting a light and dark pattern composed of light portions and dark portions onto a surface of the plate material that is traveling between the rolling stands;
an image capture unit situated between the rolling stands, the image capture unit acquiring a pattern image by capturing an image of the light and dark pattern; and
an image analysis device that measures the flatness of the plate material by analyzing the acquired pattern image,
wherein if
$L_0$ represents a distance in a horizontal direction between an intersection of respective optical axes of the projection unit and the image capture unit and, of the adjacent rolling stands, the rolling stand that is disposed at the opposite side of the intersection with respect to a looper that controls tension of the plate material between the rolling stands, $\alpha$ represents an angle formed between a vertical direction and a straight line formed by projecting the optical axis of the image capture unit onto a plane that contains a direction parallel to a rolling direction and the vertical direction, a value of a being positive if the optical axis of the image capture unit is inclined from the vertical direction toward the looper side, $\beta$ represents an angle formed between the vertical direction and a straight line formed by projecting the optical axis of the projection unit onto the plane, a value of $\beta$ being positive if the optical axis of the projection unit is inclined from the vertical direction toward the rolling stand side, hc represents a distance in the vertical direction between a pass line, which is a straight line passing through crest points of respective lower side work rolls of pairs of upper and lower work rolls that are respectively disposed at the adjacent rolling stands, and an image principal point of a lens of the image capture unit, and hp represents a distance in the vertical direction between the pass line and an image principal point of a lens of the projection unit, then $L_0$, $\alpha$, $\beta$, hc and hp satisfy the following mathematical expression (1)

$$0.75L_0 \leq \frac{\tan\alpha + \tan\beta}{1/h_C - 1/h_P} \leq 1.5L_0. \quad (1)$$

6. The device for measuring flatness of a plate material according to claim 5, wherein
if $20°\leq\alpha+\beta\leq90°$, then hp/hc≥1.133 and hc≥1000 mm are satisfied, and
if $-90°\leq\alpha+\beta\leq-20°$, then hc/hp≥1.133 and hp≥1000 mm are satisfied.

* * * * *